US006648706B2

(12) United States Patent
Kanno

(10) Patent No.: US 6,648,706 B2
(45) Date of Patent: Nov. 18, 2003

(54) CONTROL SYSTEM FOR MARINE ENGINE

(75) Inventor: Isao Kanno, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 106 days.

(21) Appl. No.: 10/078,275

(22) Filed: Feb. 14, 2002

(65) Prior Publication Data

US 2002/0137405 A1 Sep. 26, 2002

(30) Foreign Application Priority Data

Feb. 14, 2001 (JP) ....................................... 2001-037048
Sep. 21, 2001 (JP) ....................................... 2001-288523

(51) Int. Cl.[7] ................................................ B60K 41/00

(52) U.S. Cl. ........................................................ 440/84

(58) Field of Search ............................ 123/406.18, 479; 440/84–87

(56) References Cited

U.S. PATENT DOCUMENTS 5,701,866 A * 12/1997 Sagisaka et al. ....... 123/339.15
5,720,257 A 2/1998 Motose et al.
5,794,605 A 8/1998 Kato
5,816,218 A 10/1998 Motose
6,032,653 A 3/2000 Anamoto
6,135,095 A 10/2000 Motose et al.
6,223,723 B1 5/2001 Ito

FOREIGN PATENT DOCUMENTS

JP 11-303719 11/1999
JP 2000-220548 8/2000

OTHER PUBLICATIONS

Co–pending patent application: Ser. No. 09/497,570, filed Feb. 3, 2000, entitled Fuel Injection for Engine, in the name of Isao Kanno, and assigned to Sanshin Kogyo Kabushiki Kaisha.

(List continued on next page.)

*Primary Examiner*—Ed Swinehart
(74) *Attorney, Agent, or Firm*—Knobbe, Martens, Olson & Bear, LLP

(57) ABSTRACT

A personal watercraft includes a hull and a jet propulsion unit that propels the hull. An engine powers the jet propulsion unit. The engine includes an air intake system to introduce air to a combustion chamber. The intake system includes a throttle valve to regulate an amount of the air. The throttle valve is moveable generally between a closed position and an open position. A fuel injection system is arranged to spray fuel for combustion in the combustion chamber. The engine also includes an intake pressure sensor, a throttle valve position sensor and an engine speed sensor. A control device is provided to control an amount of the fuel using either a D-j control mode or an α-N control mode. The D-j control mode is based upon a signal from the intake pressure sensor and a signal from the engine speed sensor. The α-N control mode is based upon a signal from a throttle valve position sensor and the signal from the engine speed sensor. The control device uses the D-j control mode either when the throttle valve is relatively in a low opening degree range or when an engine speed is relatively in a low speed range, and uses the α-N control mode either when the throttle valve is relatively in a high opening degree range or when the engine speed is relatively in a high speed range. Additionally, the control device is configured to detect the malfunction of the throttle valve position sensor and the pressure sensor. If the throttle valve position sensor malfunctions, the control device uses only the D-j control mode. If the pressure sensor malfunctions, the control device uses only the α-N control mode.

23 Claims, 13 Drawing Sheets

OTHER PUBLICATIONS

Co–pending patent application: Ser. No. 09/626,870, filed Jul. 27, 2000, entitled Engine Control System For Outboard Motor, in the name of Isao Kanno, and assigned to Sanshin Kogyo Kabushiki Kaisha.

Co–pending patent application: Ser. No. 09/708,900, filed Nov. 8, 2000, entitled Marine Engine Control System in the name of Isao Kanno, and assigned to Sanshin Kogyo Kabushiki Kaisha.

* cited by examiner

Intake Pressure

| Engine Speed | | 0 | 100 | 200 | 400 | 800 | 1000 |
|---|---|---|---|---|---|---|---|
| | 500 | $T_{11}$ | • • • | • • • | • • • | • • • | • • • |
| | 1000 | • • • | $T_{22}$ | | | | |
| | 2000 | • • • | | $T_{33}$ | | | |
| | 4000 | • • • | | | | | |
| | 6000 | • • • | | | | | $T_{mn}$ |

| | | | | |
|---|---|---|---|---|
| Injected Fuel Amount (msec) | 0 | $T_{11}$ | • • • | $T_{mn}$ |
| Pumped Out Fuel Amount (ml/sec) | 0 | $T_{11} + A$ | • • • | $T_{mn} + A$ |
| Duty Ratio (%) | 0 | $D_{11}$ | • • • | 100 |

CONTROL SYSTEM FOR MARINE ENGINE

PRIORITY INFORMATION

This application is based on Japanese Patent Application No. 2001-037048, filed Feb. 14, 2001, and Japanese Patent Application No. 2001-288523, filed Sep. 21, 2001, the entire contents of both being hereby expressly incorporated by reference herein.

BACKGROUND OF THE INVENTION

1. Field of the Invention

The present invention relates generally to a control system for a marine engine, and more particularly to an improved control system for a marine engine that controls an amount of fuel injected by one or more fuel injectors.

2. Description of Related Art

Relatively small watercraft such as, for example, personal watercraft have become very popular in recent years. This type of watercraft is quite sporting in nature and carries one or more riders. A hull of the watercraft typically defines a rider's area above an engine compartment. An internal combustion engine powers a jet propulsion unit that propels the watercraft by discharging water rearwardly. The engine lies within the engine compartment in front of a tunnel which is formed on an underside of the hull. At least part of the jet propulsion unit is placed within the tunnel and includes an impeller that is driven by the engine.

Personal watercraft transfer to a planing position from a trolling position as they accelerate. Such watercraft operate at low speed in a trolling position, i.e., relying on their buoyancy to stay afloat. Typically, when such watercraft are idling or moving at a trolling speed, the majority of the lower portion of the hull is below the waterline, thereby displacing a sufficient volume of water to keep the watercraft floating.

As the watercraft accelerates, the impact of the water on the lower surface of the hull creates a reaction force that combines with the buoyant force to lift more of the watercraft out of the water, thereby transferring the watercraft from a trolling position to a planing position. As the watercraft transfers to the planing position, the bow of the watercraft rises relative to the surface of the body of water.

Once in the planing position, the watercraft is supported nearly entirely by the reaction force created by the impact of water on the lower surface of the hull, with little or no contribution from the buoyancy of the hull. As such, only a small portion of the lower hull contacts the water, thereby reducing the hydro-dynamic drag on the hull. Thus, the watercraft can move more quickly when in the planing position. Many riders prefer running personal watercraft, as well as other planing watercraft, in the planing position.

The engine can employ a fuel injection system that sprays fuel for combustion in one or more combustion chambers of the engine. Typically, amounts of sprayed fuel are controlled by a controller such as, for example, an electronic control unit (ECU) to maintain proper air/fuel ratios for good emission control and fuel economy. Known control systems use either a D-j control mode or an α-N control mode for the purpose. The D-j control mode determines an amount of the injected fuel based upon a signal from an intake pressure sensor and a signal from an engine speed sensor. The α-N control mode determines the amount of the injected fuel in a slightly different way and based upon a signal from a throttle valve opening degree sensor and a signal from an engine speed sensor.

SUMMARY OF THE INVENTION

One aspect of the present invention includes the realization that D-j control performs better at low engine speeds and α-N control performs better at higher engine speeds. Thus, another aspect of the invention is directed to a controller for an engine which uses an intake air pressure control scenario, such as for example but without limitation, D-j control for low engine speeds operation and which uses a throttle position control scenario, such as for example but without limitation, α-N control for higher engine speeds.

In an exemplary D-j control scenario, an amount of intake air is indirectly calculated based on a air pressure detected in the induction system of the engine. Predetermined data indicating a relationship between intake air pressure and the actual amount of air (the actual amount of air entering the combustion chamber) is applied to the detected air pressure. The data typically is stored as a control map. The D-j control mode additionally relies on data, which is stored as, for example, a three-dimensional map, indicating relationships among an amount of air, an engine speed, and an amount of fuel that would produce the desired air/fuel ratio. A desired fuel amount is thus based on the detected air pressure and the engine speed. The controller then causes the fuel injectors to inject the desired amount of fuel.

It has been found that although such a D-j control scenario performs well at lower engine speeds and smaller throttle openings, it does not maintain desired air/fuel ratios as well as at relatively higher engine speeds and larger throttle openings. In particular, this performance disparity is remarkable with multiple cylinder engines that employ separate throttle valves at respective intake passages. Thus, the D-j control mode preferably is used for control of the fuel amount in a relatively low speed range of the engine speed, and/or smaller throttle openings.

The controller, using the α-N control scenario, in turn, calculates the amount of air entering the combustion chamber indirectly from a detected throttle valve opening size. Data indicating relationships between the throttle valve opening and an actual amount of air is applied to the detected throttle opening, thereby yielding an actual amount of air entering the combustion chamber. The α-N control also utilizes data, which also is stored as, for example, another three-dimensional map, indicating relationships among an air amount, an engine speed, and an amount of fuel required to produce a desired air/fuel ratio. Thus, the desired amount of fuel is based on the throttle valve opening degree and the engine speed. The controller then causes the fuel injectors to inject the desired amount of fuel.

It has been found that the α-N control scenario performs better than the D-j scenario at higher engine speeds and larger throttle openings. In particular, this performance disparity is remarkable in multiple cylinder engines that employs separate throttle valves at each respective intake passage. The α-N control scenario, thus, preferably is used for control of the fuel amount at relatively high engine speeds and/or larger throttle openings.

As noted above, one aspect of the present invention is directed to a control systems that employs both D-j control and α-N control and switches between these modes in response to at least one of engine speed and throttle opening.

Another aspect of the present invention includes the realization that in a vehicle with an engine that employs a system that switches between two control scenarios during operation, the behavior of the engine can change noticeably during switching. In particular, it has been found that a rider of a watercraft using such a system can experience an uneasy feeling that something is wrong with the engine when the controller switches from the D-j control mode to the α-N control mode, and vice versa. Additionally, it has been found that the change in behavior is particularly noticeable during transition from a trolling position to a planing position.

Yet another aspect of the present invention includes the realization that if the intake air pressure sensor or the throttle valve position sensor malfunctions, the D-j and α-N control modes, respectively, become un-usable. However, despite the performance disparity between the D-j and α-N control modes, one of these control modes can be used for all engine speeds if the other is un-usable due to sensor malfunction. For example, if the intake air pressure sensor malfunctions, the α-N can be used for all engine speeds. Although this control mode does not perform as well at low engine speeds and small throttle openings, it will allow the engine to operate with only minor or no changes in engine behavior that are noticeable by a rider. Similarly, if the throttle position sensor malfunctions, D-j control mode can be used for all engine speeds.

A need therefore exists for an improved control system more reliably provides a desired air/fuel ratio without producing noticeable changes in engine behavior.

In accordance with one aspect of the present invention, a watercraft includes a hull and an engine supported by the hull. The engine comprises an engine body, a fuel supply system connected to the engine and configured to supply fuel for combustion in the engine body. A first sensor is configured to detect a first engine operation parameter and a second sensor is configured to detect a second engine operation parameter. The watercraft also includes a controller configured to control at least the fuel supply system. In particular, the controller is configured to control the fuel supply system according to a first mode in a first engine speed range and to control the fuel supply system according to a second mode in a second engine speed range. Additionally, the controller is configured to control the fuel supply system according to a malfunction mode in which the first mode is used to control the fuel supply system for the second engine speed range if the second sensor malfunctions, and to use the second mode to control the fuel supply system for the first engine speed range if the first sensor malfunctions.

In accordance with another aspect of the present invention, a method for controlling an engine for a watercraft includes detecting an engine speed and determining if the engine speed is in a first engine speed range or a second engine speed range which is higher than the first speed range. The method also includes controlling fuel supply to the engine according to a first mode based on output from a first sensor when the engine speed is in the first range and controlling fuel supply to the engine according to a second mode based on output from a second sensor when the engine speed is in the second range. Additionally, the method includes detecting a malfunction of the first and second sensors, controlling fuel supply according to the first mode in the second speed range when the second sensor malfunctions, and controlling fuel supply according to the second mode in the first engine speed range when the first sensor malfunctions.

BRIEF DESCRIPTION OF THE DRAWINGS

These and other features, aspects and advantages of the present invention will now be described with reference to the drawings of a preferred embodiment which is intended to illustrate and not to limit the invention. The drawings comprise 16 figures.

DETAILED DESCRIPTION OF THE PREFERRED EMBODIMENT OF THE INVENTION

Figure 1:
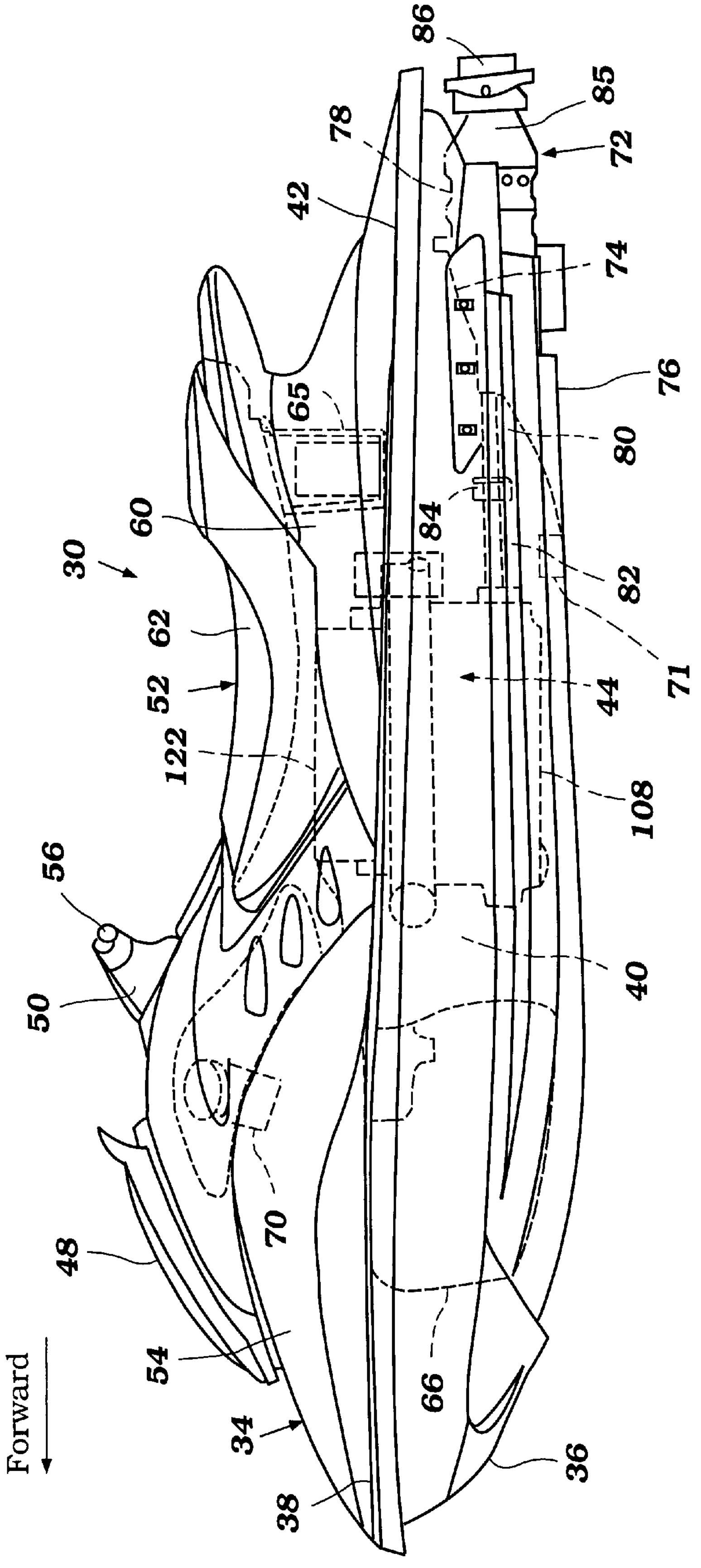
FIG. 1 is a side elevational view of a personal watercraft including an engine configured in accordance with a preferred embodiment of the present invention.
Figure 2:
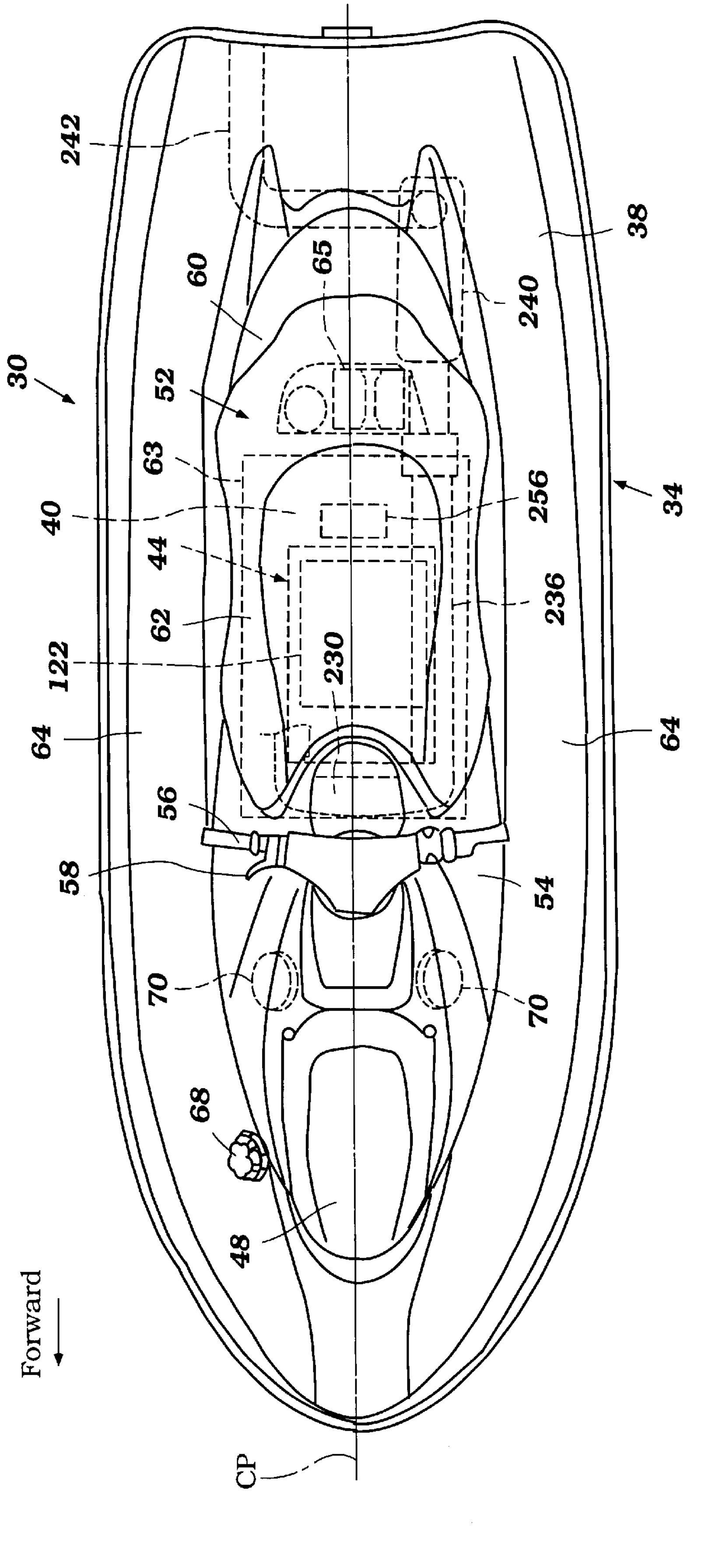
FIG. 2 is a top plan view of the watercraft of FIG. 1.
Figure 3:
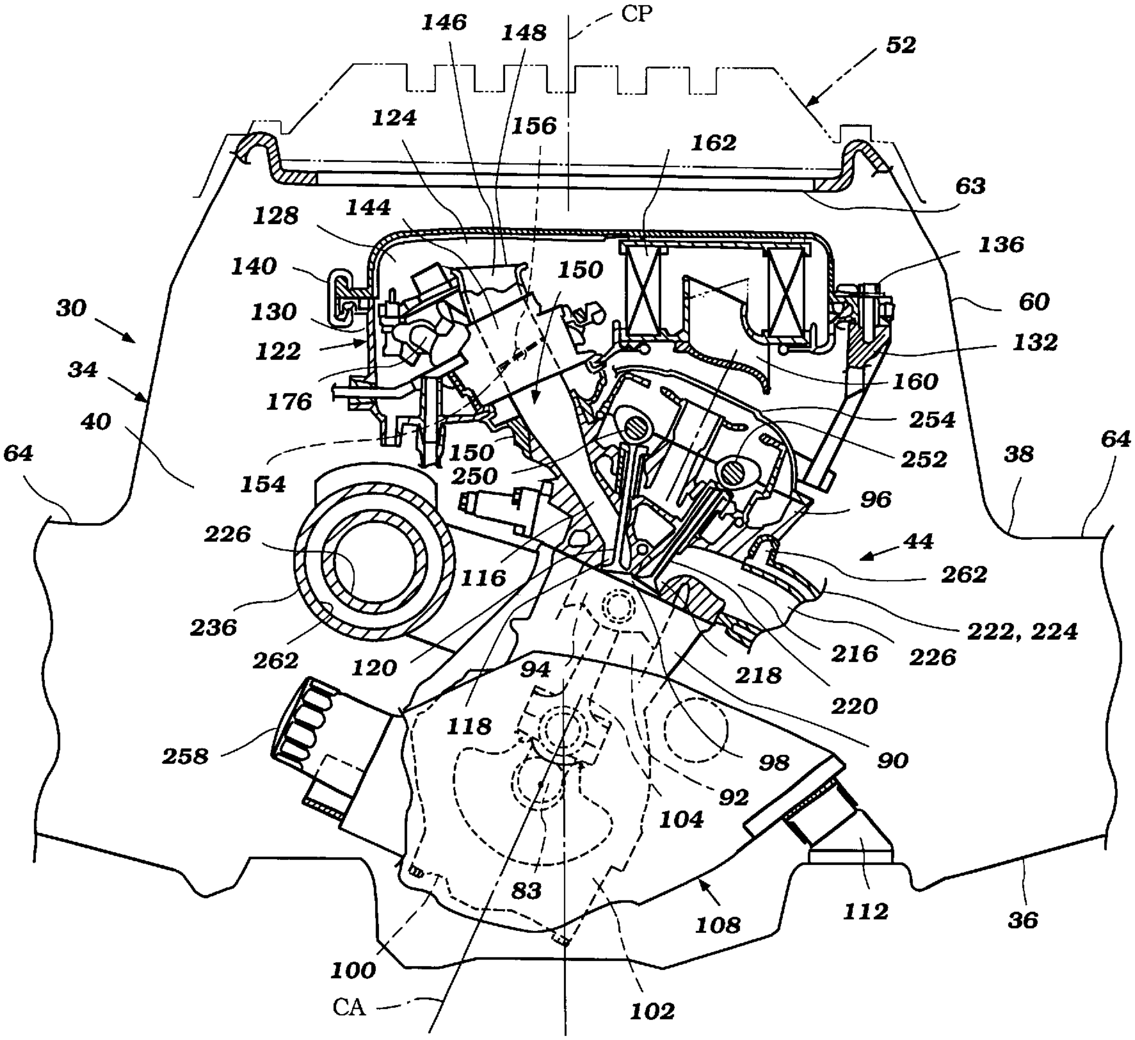
FIG. 3 is a partially sectioned rear view of a hull of the watercraft and an engine disposed within the hull.

With reference to FIGS. 1–3, an overall construction of a personal watercraft 30 configured in accordance with the present invention will be described. The watercraft 30 is described in the context of a personal watercraft. The watercraft 30, however, can be other types of watercraft such as jet boats or other motor boats inasmuch as they transfer to planing position from a trolling position. Applicable watercraft will become apparent to those of ordinary skill in the art.

The personal watercraft 30 includes a hull 34 generally formed with a lower hull section 36 and an upper hull section or deck 38. Both the hull sections 36, 38 are made of, for example, a molded fiberglass reinforced resin or a sheet molding compound. The lower hull section 36 and the upper hull section 38 are coupled together to define an internal cavity 40. An intersection of the hull sections 36, 38 is defmed in part along an outer surface gunwale or bulwark 42. The hull 36 houses an internal combustion engine 44 that powers the watercraft 30.

As shown in FIGS. 2 and 3, the hull 34 defines a center plane CP that extends generally vertically from bow to stem with the watercraft 30 floating in a normal upright position. The lower hull section 36 is designed such that the watercraft 30 planes or rides on a minimum surface area at the aft end of the lower hull 38 in order to optimize the speed and handling of the watercraft 30 when up on plane. For this purpose, the lower hull section 36 generally has a V-shaped configuration formed by a pair of inclined sections that extend outwardly from the center plane CP of the hull 34 to the hull's side walls at a dead rise angle.

Each inclined section desirably includes at least one strake. The strakes preferably are symmetrically disposed relative to the keel line of the watercraft 30. The inclined sections also extend longitudinally from the bow toward the transom of the lower hull 38 along the center plane CP. The side walls are generally flat and straight near the stem of the lower hull 38 and smoothly blend toward the center plane CP at the bow. The lines of intersection between the inclined sections and the corresponding side walls form the outer chines of the lower hull section 36.

Along the center plane CP, the upper hull section 38 includes a hatch cover 48, a steering mast 50 and a seat 52 along a direction from fore to aft.

In the illustrated embodiment, a bow portion 54 of the upper hull section 38 slopes upwardly and an opening (not shown) is provided through which a rider can conveniently access a front portion of the internal cavity 40. The bow portion 54 preferably is partially covered with a pair of separate cover member or "cowling" pieces. The hatch cover 48 is hinged to open or is detachably affixed to the bow portion 54 to close the opening.

The steering mast 50 extends generally upwardly toward the top of the bow portion 54 to support a handle bar 56. The handle bar 56 is provided primarily to allow a rider to change a thrust direction of the watercraft 30. The handle bar 56 also carries control devices such as, for example, a throttle lever 58 (FIG. 2) for controlling the engine operation.

The seat 52 extends fore to aft along the center plane CP at a location behind the steering mast 50. The seat 52 is configured generally with a saddle shape so that the rider can straddle the seat 52. The seat 52 comprises a seat pedestal 60 and a seat cushion 62.

The upper hull section 38 defines the seat pedestal 60. The seat cushion 62 has a rigid backing and is detachably supported by the seat pedestal 60.

An access opening 63 (FIGS. 2 and 3) is defined in an upper surface of the seat pedestal 60 so that a rider can conveniently access a rear portion of the internal cavity 40. The access opening 63 is normally closed by the seat cushion 62.

Foot areas 64 (FIG. 2) are defined on both sides of the seat 52 and on an upper surface of the upper hull section 38. The foot areas 64 are generally flat. However, the foot areas 64 can slope upwardly toward the aft of the watercraft 30. The upper hull section 38 also defines a storage box 65 under the seat cushion 62 within the seat pedestal 60.

The entire internal cavity 40 can be an engine compartment for the watercraft 30. Optionally, the watercraft 30 can include one or more bulkheads (not shown) which divide the internal cavity 40 into an engine compartment and at least one other internal compartment (not shown).

A fuel tank 66 is placed in the internal cavity 40 under the bow portion 54 of the upper hull section 38. The fuel tank 66 is coupled with a fuel inlet port (not shown) positioned atop the upper hull section 38 through a fuel duct. A closure cap 68 (FIG. 2) closes the fuel inlet port. Optionally, the closure cap 68 can be disposed under the hatch cover 48.

A pair of air ducts or ventilation ducts 70 preferably is provided on both sides of the bow portion 54 so that the ambient air can enter and exit the internal cavity 40 through the ducts 70. Except for the air ducts 70, the internal cavity 40 is substantially sealed to protect the engine 44, a fuel supply system including the fuel tank 66 and other systems or components from water.

The engine 44 preferably is placed within the engine compartment 40 and generally under the seat 52, although other locations are also possible (e.g., beneath the steering mast 50 or in the bow). The rider can access the engine 44 through the access opening 63 by detaching the seat cushion 62 from the seat pedestal 60.

A bilge pump 71 preferably is placed at the bottom of the engine compartment 40 to remove water from the engine compartment 40. An overall construction of the engine 44 and exemplary operations thereof are described in greater detail below with reference to FIGS. 3–10.

A propulsion device propels the watercraft 30. In the illustrated arrangement, a jet pump assembly or propulsion device 72 is employed for propelling the watercraft 30. The jet pump assembly 72 is mounted in a tunnel 74 formed on the underside of the lower hull section 36. Optionally, a bulkhead can be disposed between the tunnel 74 and the engine 44.

The tunnel 74 has a downward facing inlet port 76 opening toward the body of water. A pump housing 78 is defined within the tunnel 74 to communicate with the inlet port 76. An impeller (not shown) is journaled within the pump housing 78. An impeller shaft 80 extends forwardly from the impeller and is coupled with an output shaft 82 extending from the engine 44 by a coupling member 84. The output shaft 82 is connected to a crankshaft 83 (FIG. 3) of the engine 44 through a coupling mechanism such as, for example, a gear combination including a reduction gear.

A rear end of the pump housing 78 defines a discharge nozzle 85. A deflector or steering nozzle 86 is affixed to the discharge nozzle 85 for pivotal movement about a steering axis which extends generally vertically. A cable (not shown) connects the deflector 86 with the steering mast 50 so that the rider can steer the deflector 86, and thereby change the direction of travel of the watercraft 30.

In operation, the engine 44 drives the impeller shaft 80 and thus the impeller, and water is drawn from the surrounding body of water through the inlet port 76. The pressure generated in the housing 78 by the impeller produces a jet of water that is discharged through the discharge nozzle 85 and the deflector 86. The water jet thus produces thrust to propel the watercraft 30. The rider can steer the deflector 86 with the handle bar 56 of the steering mast 50 to turn the watercraft 30 in either right or left direction.

Because of the configuration of the lower hull section 36 described above, the illustrated watercraft 30 can take at least two positions, i.e., a trolling position and a planing position. More specifically, the planing position can include a transitional planing position and a fully planing position. The watercraft 30 transfers to the fully planing position from the trolling position through the transitional planing position, as it accelerates.

The watercraft 30 operates in the trolling position at relatively slow speeds. A major part of the lower hull section 36 is submerged in the trolling position and thus displaces the water surrounding the lower hull section 36. As the watercraft 30 accelerates, it enters a transitional planing position in which the bow portion 54 inclines at a relatively large angle relative to the surface of the body of water. The faster the speed, the larger the angle.

As the watercraft 30 accelerates past the transitional planing speed, the watercraft 30 transfers to the fully planing position in which the bow portion 54 lowers to a relatively smaller angle relative to the surface of the body of water. Once the watercraft 30 is in the fall planing position, the inclination of the bow portion 54 remains generally constant.

With continued reference to FIGS. 1–3 and additional reference to FIGS. 4–10, the engine 44 operates on a four-cycle combustion principle. The engine 44 comprises a cylinder block 90 that preferably defines four inclined cylinder bores 92 arranged from fore to aft along the center plane CP. The engine 44 thus is a L4 (in-line four cylinder) type. The illustrated four-cycle engine, however, merely exemplifies one type of engine. Engines having other number of cylinders including a single cylinder, and having other cylinder arrangements (V and W type) and other cylinder orientations (e.g., upright cylinder banks) are all practicable.

Each cylinder bore 92 has a center axis CA that is slanted with a certain angle from the center plane CP so that the overall height of the engine 44 is shorter. All the center axes CA of the cylinder bores 92 preferably have the same angle relative to the center plane CP.

Moveable members such as pistons 94 move relative to the cylinder block 90 and specifically within the cylinder bores 92. A cylinder head member 96 is affixed to an upper end portion of the cylinder block 90 to close respective upper ends of the cylinder bores 92 to define combustion chambers 98 with the cylinder bores 92 and the pistons 94.

A crankcase member 100 is affixed to a lower end portion of the cylinder block 90 to close respective lower ends of the cylinder bores 92 and to define a crankcase chamber 102 with the cylinder block 90. The crankshaft 83 is another moveable member and is journaled for rotation by at least one bearing formed on the crankcase member 100. Connecting rods 104 couple the crankshaft 83 with the pistons 94 so that the crankshaft 83 rotates with the reciprocal movement of the pistons 94.

The cylinder block 90, the cylinder head member 96 and the crankcase member 100 together define an engine body 108. The engine body 108 preferably is made of aluminum based alloy. In the illustrated embodiment, the engine body 108 is oriented in the engine compartment to position the crankshaft 83 generally parallel to the center plane CP and to extend generally in the longitudinal direction. Other orientations of the engine body 108, of course, also are possible (e.g., with a transverse or vertical oriented crankshaft).

Engine mounts 112 extend from both sides of the engine body 108. The engine mounts 112 preferably include resilient portions made of flexible material, for example, a rubber material. The engine body 108 is mounted on the lower hull section 36, specifically, a hull liner, by the engine mounts 112 so that vibrations from the engine 44 are inhibited from transferring to the hull section 36.

The engine 44 preferably comprises an air intake system configured to guide air to the engine body 108, and thus to the combustion chambers 98. The illustrated air intake system includes four inner intake passages 116 defined in the cylinder head member 96. The inner intake passages 116 communicate with the associated combustion chambers 98 through one or more intake ports 118. Intake valves 120 are provided at the intake ports 118 to selectively connect and disconnect the intake passages 116 with the combustion chambers 98. In other words, the intake valves 120 move between open and closed positions of the intake ports 118.

Preferably, the air intake system also includes a plenum chamber assembly or air intake box 122 for smoothing and quieting intake air. The illustrated plenum chamber assembly 122 has a generally rectangular shape in a top plan view (FIG. 2) and defines a plenum chamber 124 therein. Other shapes of the plenum chamber assembly 122 of course are possible, but it is preferable to make the plenum chamber 124 as large as possible within the space provided between the engine body 108 and the seat 52.

With reference to FIG. 3, The plenum chamber assembly 122 comprises an upper chamber member 128 and a lower chamber member 130. The illustrated upper and lower chamber members 128, 130 are made of plastic, although metal or other materials can be used. Optionally, the plenum chamber assembly 122 can be formed by only one or a different number of members and/or can have a different assembly orientation (e.g., side-by-side).

The lower chamber member 130 preferably is coupled with the engine body 108. In the illustrated embodiment, several stays 132 extend upwardly from the engine body 108 and several bolts 136 rigidly affix the lower chamber member 130 to respective top surfaces of the stays 132. Several coupling or fastening members 140, which are generally configured as a shape of the letter "C" in section, couple the upper chamber member 128 with the lower chamber member 130.

The lower chamber member 130 defines four apertures aligned parallel to the center plane CP. Preferably, four throttle bodies 144 extend through the apertures and are affixed to the lower chamber member 130 with a seal member. The throttle bodies 144 are generally positioned on the port side of the plenum chamber 124.

Respective bottom ends of the throttle bodies 144 are coupled with the associated inner intake passages 116. The throttle bodies 144 preferably extend generally vertically but slant toward the port side oppositely from the center axis CA of the engine body 108. The throttle bodies 144 define outer intake passages 146 with air inlets 148 opening upwardly within the plenum chamber 124. Each throttle body 144 includes a rubber boot 150 which extends between the lower chamber member 130 and the cylinder head member 96 and defines a portion of the outer intake passage 146 therein so that the outer air passages 146 are connected to the inner intake passages 116. The outer and inner intake passages 146, 116 together define intake passages 150 of the air intake system.

Air in the plenum chamber 124 is drawn into the combustion chambers 98 through the intake passages 150 when negative pressure is generated in the combustion chambers 98. The negative pressure is generally made when the pistons 94 move toward the bottom dead center from the top dead center.

Figure 7:
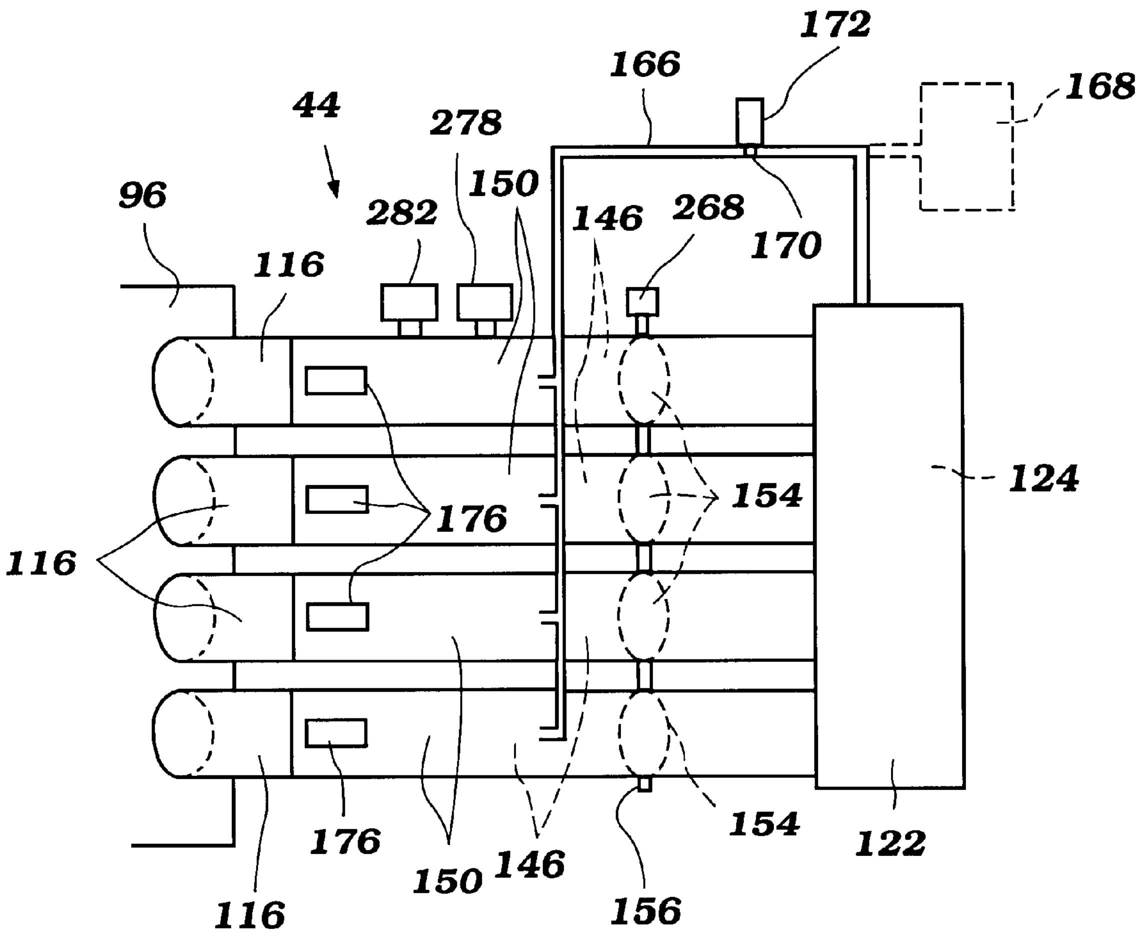
FIG. 7 is a schematic view of the air intake system shown in FIG. 6 including a control valve disposed in a bypass passage.

A throttle valve 154 is separately provided in each throttle body 144 and is journaled for pivotal movement. A valve shaft 156 links all of the throttle valves 154 as shown in FIG. 7 to synchronize the valves 154 with each other. The pivotal movement of the valve shaft 156 is controlled by the throttle lever 58 on the handle bar 56 through a control cable that is connected to the valve shaft 156. The rider thus can control an opening degree of each throttle valve 154 by operating the throttle lever 58 to obtain various engine speeds. That is, the throttle valves 154 pivot between a fully closed position and a fully open position to meter or regulate an amount of air passing through the throttle bodies 144.

Normally, the greater the opening degree of the throttle valves 154, the higher the rate of airflow and the higher the load on the engine and thus the higher the engine speed. In general, the watercraft 30 can be propelled at a speed that proportional to the engine speed. Accordingly, the watercraft 30 transfers to the fully planing position from the trolling position generally with the watercraft 30 speed increasing in proportion to the engine speed. However, it should be noted that excess loads such as, for example, an adverse wind against the watercraft 30 can make the actual speed of the watercraft 30 slower than the theoretical thrust speed, e.g., the theoretical speed based on velocity and mass of water discharged from the jet pump.

With reference to FIG. 3, one or more air inlet ports 160 are configured to guide air into the plenum chamber 124. In the illustrated embodiment, a filter or air cleaner unit 162 is positioned on the starboard side of the plenum chamber 124 and opposite from the throttle bodies 144. The filter unit 162 contains at least one filter element therein. All of the air that comes into the inlet ports 160 inevitably goes through the filter element, which removes foreign substances, including water, from the air.

Figure 6:
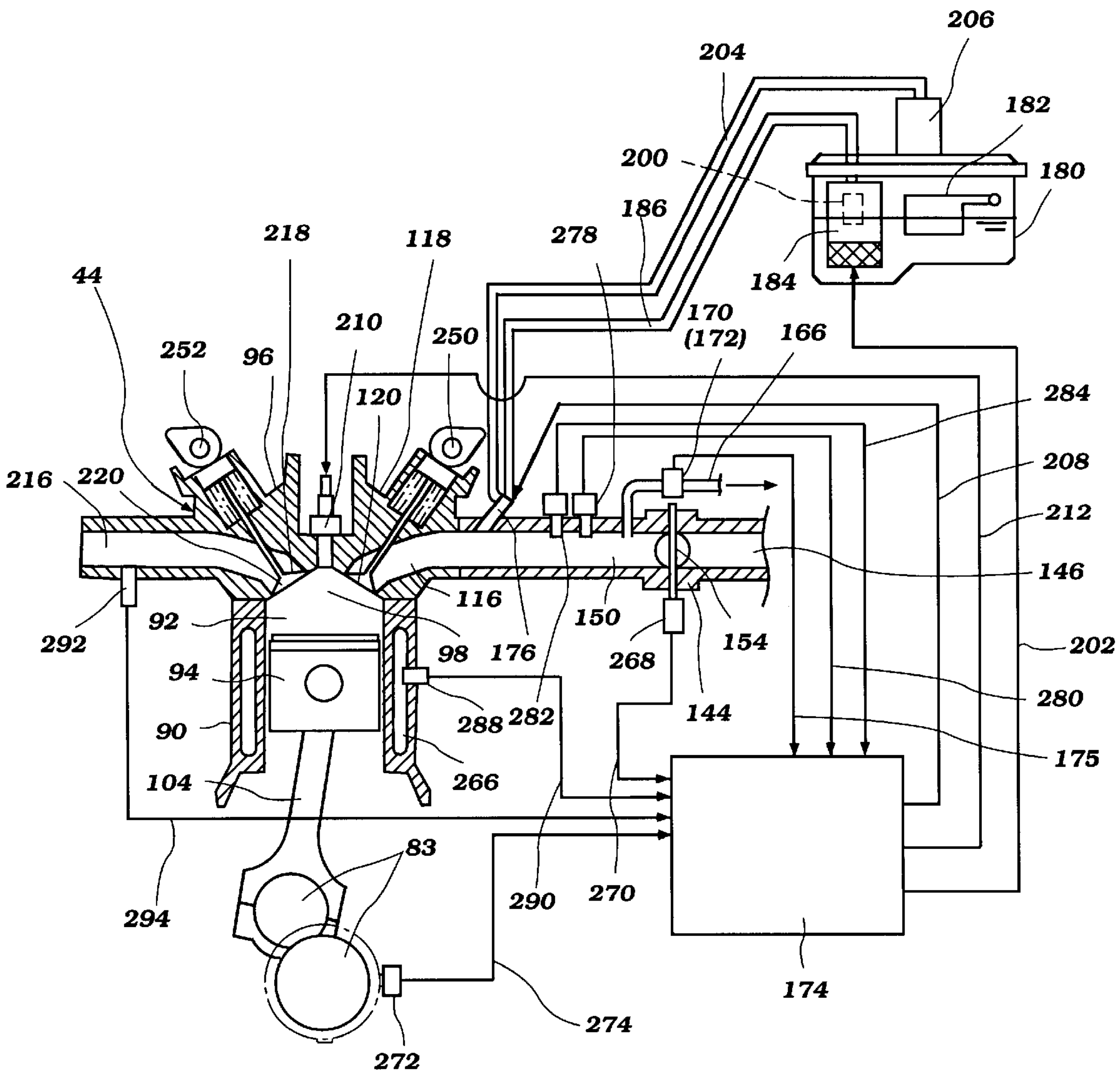
FIG. 6 is a schematic view of the engine shown in FIG. 1 with a control system thereof, including an air intake system, an exhaust system, a fuel injection system and an ignition system.

With reference to FIGS. 6 and 7, the illustrated air intake system additionally includes a bypass passage 166 configured to allow air to bypass the throttle valves 154 and enter the combustion chambers 98.

The bypass passage 166 preferably connects the plenum chamber 124 with respective portions of the intake passages 150 located downstream of the throttle valves 154. Alternatively, an auxiliary plenum chamber 168 can be provided separately from the plenum chamber 124 and the bypass passage 166 can be coupled with the auxiliary chamber 168.

The bypass passage 166 includes a control valve 170 that is moveable between a fully closed position and a fully open position. A stepper motor 172 preferably is provided to move the control valve 170 under control of an electronic control unit (ECU) or control device 174 through a control signal line 175 (FIG. 6).

The control valve 170 can become stuck if not moved for a relatively long period of time. For example, saline moisture surrounding the engine 44 can cause the control valve to stick in one position. Because stepper motors, such as the stepper motor 172, normally are more powerful than other actuators such as, for example, a solenoid actuator, the control valve 170 can be relatively easily moved even if such sticking occurs.

The ECU 174 is disposed within the engine compartment 40 and preferably is mounted on the engine body 108 to control various engine operations as well as the control of the control valve 170. A preferable control strategy is described in great detail below with particular reference to FIG. 12.

The engine 44 preferably comprises an indirect or port injected fuel injection system. The fuel injection system includes four fuel injectors 176 (FIGS. 3, 6 and 7) with one injector allotted to each throttle body 144.

The fuel injectors 176 are affixed to a fuel rail (not shown) that is mounted on the throttle bodies 144. The fuel injectors 176 have injection nozzles that open downstream of the throttle valves 154. More specifically, the injection nozzles preferably are opened and closed by an electromagnetic component, such as a solenoid unit, which is slideable within an injection body. The solenoid unit generally comprises a solenoid coil, which is controlled by signals from the ECU 174.

When each nozzle is opened, pressurized fuel is released from the fuel injectors 176. The fuel injectors 176 thus spray the fuel into the intake passages 150 during an open timing of the intake ports 118. The sprayed fuel enters the combustion chambers 98 with the air that passes through the intake passages 150.

The fuel is supplied from the fuel tank 66. In the illustrated arrangement, fuel is drawn from the fuel tank 66 by one or more low pressure fuel pumps (not shown) and is deliver to a vapor separator 180 (FIG. 6) through a fuel supply passage (not shown). The vapor separator 180 can be placed within the engine compartment 40 and preferably is mounted on the engine body 108. A float valve operated by a float 182 can be provided so as to maintain a substantially uniform level of the fuel contained in the vapor separator 180.

A high pressure fuel pump 184 preferably is provided in the vapor separator 180. The high pressure fuel pump 184 pressurizes fuel that is delivered to the fuel injectors 176 through a fuel delivery passage 186. The fuel rail, noted above, defines a portion of the delivery passage 186. The high pressure fuel pump 184 in the illustrated embodiment preferably comprises a positive displacement pump. The construction of the pump 184 thus generally inhibits fuel flow from its upstream side back into the vapor separator 180 when the pump 184 is not running.

Although not illustrated, a back-flow prevention device (e.g., a check valve) also can be used to prevent a flow of fuel from the delivery passage 186 back into the vapor separator 180 when the pump 184 is off. This later approach can be used with a fuel pump that employs a rotary impeller to inhibit a drop in pressure within the delivery passage 186 when the pump 184 is intermittently stopped.

The high pressure fuel pump 184 is driven by a fuel pump drive motor 200 which, in the illustrated arrangement, is electrically operable and is unified with the pump 184 at its bottom portion. The drive motor 200 desirably is positioned in the vapor separator 180. The drive motor 200 preferably is controlled by the ECU 174 through a control signal line 202 with a duty ratio control method, described below in greater detail.

A fuel return passage 204 also is provided between the fuel injectors 176 and the vapor separator 180. Excess fuel that is not injected by the injectors 176 returns to the vapor separator 180 through the return passage 204. A pressure regulator 206 can be positioned at a vapor separator end of the return passage 204 to limit the pressure that is delivered to the fuel injectors 176 by dumping the fuel back into the vapor separator 180.

As thus described, the fuel injectors 176 spray fuel into the intake passages 150 through the nozzles at an injection timing and duration under control of the ECU 174 through a control signal line 208. That is, the solenoid coil is supplied with electric power at the selected timing and for the selected duration. Because the pressure regulator 206 controls the fuel pressure, the duration can be used to control the amount of fuel that will be injected.

The sprayed fuel is drawn into the combustion chambers 98 together with the air to form a proper air/fuel charge therein. Holding the proper air/fuel ratio is one of the most significant matters in control of the engine operations. Preferable control strategy of the air/fuel ratio is described below in greater detail.

It should be noted that a direct fuel injection system that sprays fuel directly into the combustion chambers 98 can replace the indirect fuel injection system described above.

With reference to FIG. 6, the engine 44 preferably comprises a firing or ignition system. The firing system includes four spark plugs 210, one spark plug allotted to each combustion chamber 98. The spark plugs 210 are affixed to the cylinder head member 96 so that electrodes, which are defined at ends of the plugs 210, are exposed to the respective combustion chambers 98. The spark plugs 210 fire the air/fuel charge in the combustion chambers 98 at an ignition timing under control of the ECU 174 through a control signal line 212. The air/fuel charge thus is burned within the combustion chambers 98 to move the pistons 94 generally downwardly.

With reference to FIGS. 3–6, the engine 44 preferably comprises an exhaust system configured to discharge burnt charges, i.e., exhaust gases, from the combustion chambers 98. In the illustrated embodiment, the exhaust system includes four inner exhaust passages 216 defined within the cylinder head member 96. The exhaust passages 216 communicate with the associated combustion chambers 98 through one or more exhaust ports 218. Exhaust valves 220 are provided at the exhaust ports 218 to selectively connect and disconnect the exhaust passages 216 from the combustion chambers 98. In other words, the exhaust valves 220 move between open and closed positions of the exhaust ports 218.

In the illustrated arrangement, first and second exhaust manifolds 222, 224 depend from the cylinder head member 96 at a side surface thereof on the starboard side. The exhaust manifolds 222, 224 define outer exhaust passages 226 that are coupled with the inner exhaust passages 216 to collect exhaust gases from the respective inner exhaust passages 216.

The first exhaust manifold 222 has a pair of end portions spaced apart from each other with a length that is equal to a distance between the forward-most exhaust passage 216 and the rear-most exhaust passage 216. The end portions are connected with the forward most and rear-most exhaust passages 216. The second exhaust manifold 224 also has a pair of end portions spaced apart from each other with a length that is equal to a distance between the other two or in-between exhaust passage 216. The end portions are connected with the in-between exhaust passages 216.

The exhaust manifolds 222, 224 extend slightly downwardly. Respective downstream ends of the first and second exhaust manifolds 222, 224 are coupled with an upstream end of a first unitary exhaust conduit 228. The first unitary conduit 228 extends further downwardly and then upwardly and forwardly in the downstream direction. A downstream end of the first unitary conduit 228 is coupled with an upstream end of a second unitary exhaust conduit 230.

The second unitary conduit 230 extends further upwardly and then transversely to end in front of the engine body 108. The second unitary conduit 230 is coupled with an exhaust pipe 236 on the front side of the engine body 108. The coupled portions thereof preferably are supported by a front surface of the engine body 108 via a support member 238. The exhaust pipe 236 extends rearwardly along a side surface of the engine body 108 on the port side and then is connected to an exhaust silencer or water-lock 240 at a forward surface of the exhaust silencer 240.

With reference to FIG. 2, the exhaust silencer 240 preferably is placed at a location generally behind and on the port side of the engine body 108. The exhaust silencer 240 is secured to the lower hull 36 or to a hull liner. A discharge pipe 242 extends from a top surface of the exhaust silencer 240 and transversely across the center plane CP to the starboard side. The discharge pipe 242 then extends rearwardly and opens at the tunnel 74 and thus to the exterior of the watercraft 30 in a submerged position. The exhaust silencer 240 has one or more expansion chambers to reduce exhaust noise and also inhibits the water in the discharge pipe 242 from entering the exhaust pipe 236 even if the watercraft 30 capsizes as is well known.

Figure 4:
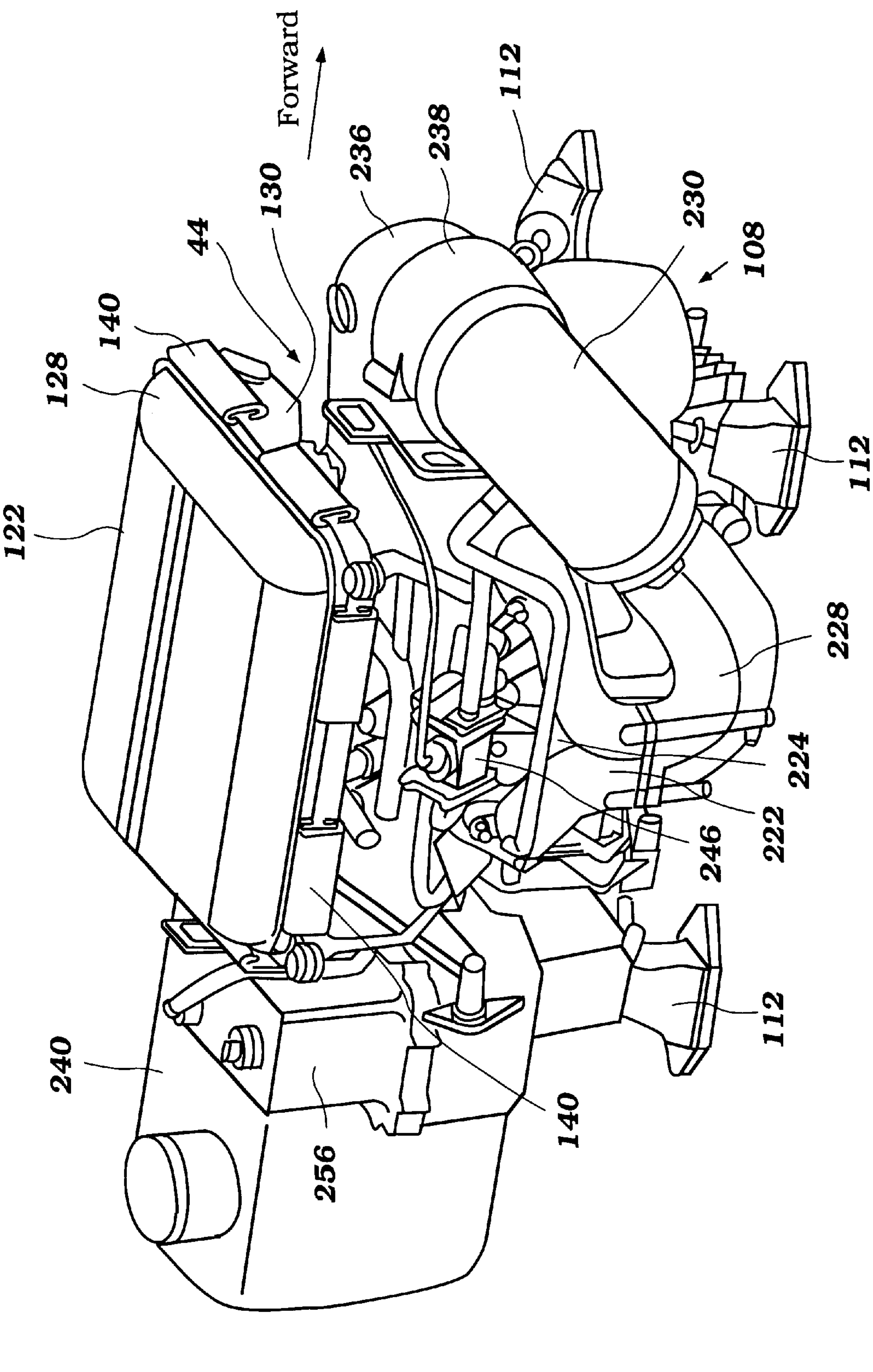
FIG. 4 is a front, top, and starboard side perspective view of the engine shown in FIG. 3.
Figure 5:
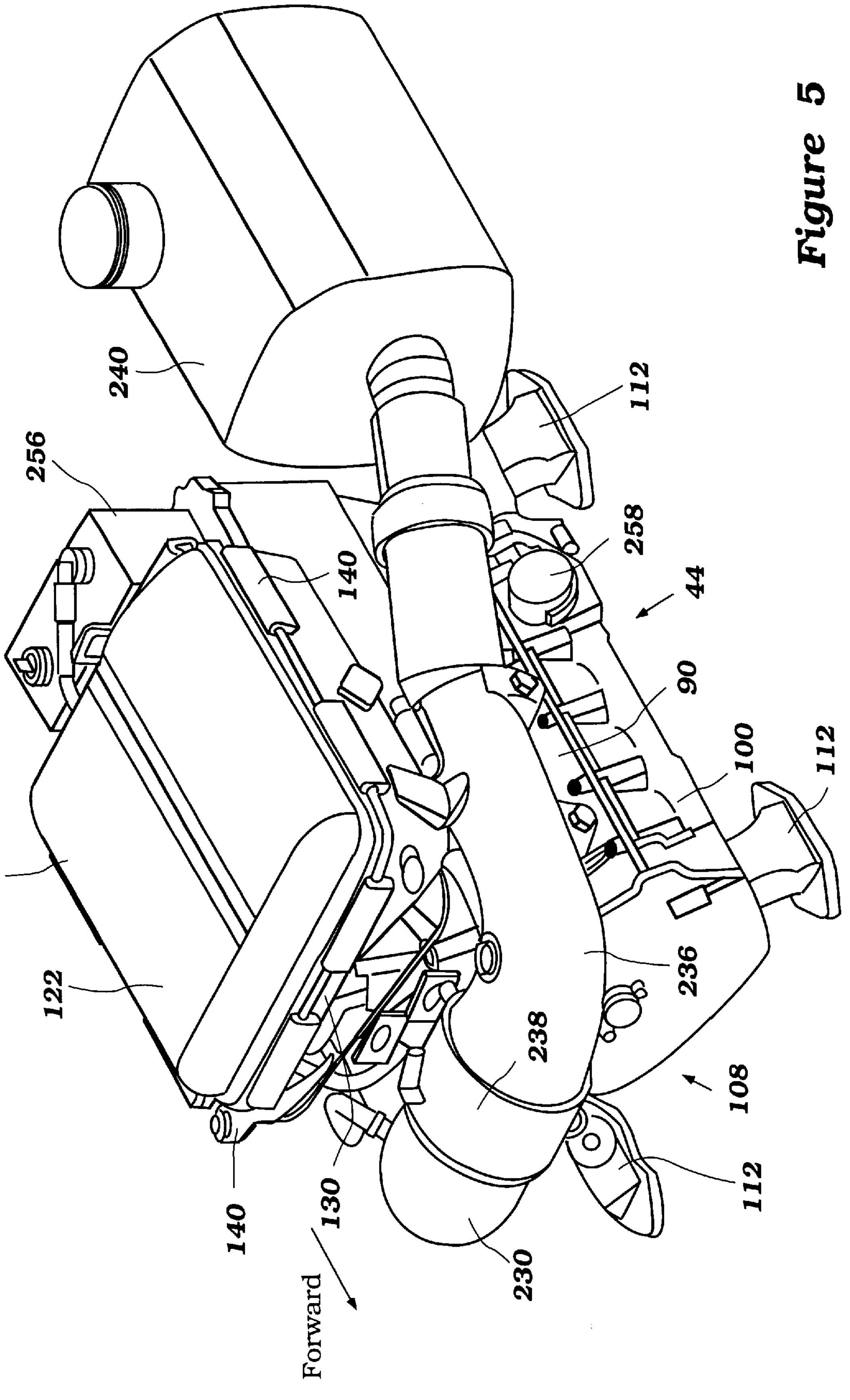
FIG. 5 is a top, front, and port side perspective view of the engine shown in FIG. 3.

With reference to FIG. 4, the engine 44 preferably comprises an air injection system (AIS) that includes a secondary air injection device 246 connected with the intake and exhaust systems. The AIS supplies a portion of the air passing through the air intake system to the exhaust system to clean the exhaust gases therein. More specifically, for example, hydro carbon (HC) and carbon monoxide (CO) components of the exhaust gases can be removed by an oxidation reaction with oxygen ($O_2$) that is supplied to the exhaust system through the AIS.

With reference to FIGS. 3 and 6, the engine 44 has a valve actuation mechanism for actuating the intake and exhaust valves 120, 220. In the illustrated embodiment, the valve actuation mechanism comprises a double overhead camshaft drive including an intake camshaft 250 and an exhaust camshaft 252. The intake and exhaust camshafts 250, 252 actuate the intake and exhaust valves 120, 220, respectively. The intake camshaft 250 extends generally horizontally over the intake valves 120 from fore to aft in parallel to the center plane CP, while the exhaust camshaft 252 extends generally horizontally over the exhaust valves 220 from fore to aft also in parallel to the center plane CP. Both the intake and exhaust camshafts 250, 252 are journaled for rotation by the cylinder head member 96 with a plurality of camshaft caps. The camshaft caps holding the camshafts 250, 252 are affixed to the cylinder head member 96. A cylinder head cover member 254 extends over the camshafts 250, 252 and the camshaft caps, and is affixed to the cylinder head member 96 to define a camshaft chamber. The foregoing stays 132 and the secondary air injection device 246 preferably are affixed to the cylinder head cover member 254.

The intake and exhaust camshafts 250, 252 have cam lobes associated with the intake and exhaust valves 120, 220, respectively. The intake and exhaust valves 120, 220 normally close the intake and exhaust ports 118, 218 by biasing force of springs. When the intake and exhaust camshafts 250, 252 rotate, the respective cam lobes push the associated valves 120, 220 to open the respective ports 118, 218 against the biasing force of the springs. The air thus can enter the combustion chambers 98 at every opening timing of the intake valves 120 and the exhaust gases can move out from the combustion chambers 98 at every opening timing of the exhaust valves 220. The crankshaft 83 preferably drives the intake and exhaust camshafts 250, 252.

Preferably, the respective camshafts 250, 252 have driven sprockets affixed to ends thereof. The crankshaft 83 also has a drive sprocket. Each driven sprocket has a diameter which is twice as large as a diameter of the drive sprocket. A timing chain or belt is wound around the drive and driven sprockets. When the crankshaft 83 rotates, the drive sprocket drives the driven sprockets via the timing chain, and then the intake and exhaust camshafts 250, 252 rotate also. The rotational speed of the camshafts 250, 252 are reduced to half of the rotational speed of the crankshaft 83 because of the differences in diameters of the drive and driven sprockets.

In operation, ambient air enters the engine compartment 40 defined in the hull 34 through the air ducts 70. The air is introduced into the plenum chamber 124 defmed by the plenum chamber assembly 122 through the air inlet ports 160 and then is drawn into the throttle bodies 144. The air cleaner element of the filter unit 162 cleans the air. The majority of the air except for the air to the AIS in the plenum chamber 124 is supplied to the combustion chambers 98. The throttle valves 154 in the throttle bodies 144 regulate an amount of the air toward the combustion chambers 98. Changing the opening degrees of the throttle valves 154 that are controlled by the rider with the throttle lever 58 regulates the airflow across the valves. The air flows into the combustion chambers 98 when the intake valves 118 are opened. At the same time, the fuel injectors 176 spray fuel into the intake passages 150 under the control of ECU 174. Air/fuel charges are thus formed and are delivered to the combustion chambers 98.

The air/fuel charges are fired by the spark plugs 210 also under the control of the ECU 174. The burnt charges, i.e., exhaust gases, are discharged to the body of water surrounding the watercraft 30 through the exhaust system. A relatively small amount of the air in the plenum chamber 124 is supplied to the exhaust system through the AIS to purify the exhaust gases. The burning of the air/fuel charge makes the pistons 94 reciprocate within the cylinder bores 92 to rotate the crankshaft 83.

The engine 44 preferably includes a lubrication system that delivers lubricant oil to engine portions for inhibiting frictional wear of such portions. In the illustrated embodiment, a closed-loop type, dry-sump lubrication system is employed. Lubricant oil for the lubrication system preferably is stored in a lubricant reservoir or tank 256 (FIGS. 2, 4 and 5) disposed in the rear of the engine body 108 and is affixed thereto. An oil filter unit 258 (FIGS. 3 and 5) is detachably mounted on the crankcase member 100 on the port side. The oil filter unit 258 contains at least one filter element to remove alien substances from the lubricant oil circulating in the lubrication system. The oil filter unit 258 also can separate water component from the lubricant oil. The lubrication system includes one or more oil pumps that are preferably driven by the crankshaft 83 in the circulation loop to deliver the oil in the lubricant reservoir 256 to the engine portions that need lubrication and to return the oil to the reservoir 256.

The watercraft 30 preferably employs a water cooling system for the engine 44 and the exhaust system. Preferably, the cooling system is an open-loop type and includes a water pump and a plurality of water jackets and/or conduits. In the illustrated arrangement, the jet pump assembly 72 is used as the water pump with a portion of the water pressurized by the impeller being drawn off for the cooling system, as known in the art.

The engine body 108, the respective exhaust conduits 222, 224, 228, 230, 236 define the water jackets. Both portions of the water to the water jackets of the engine body 108 and to the water jackets of the exhaust system can flow through either common channels or separate channels formed within one or more exhaust conduits 222, 224, 228, 230, 236 or external water pipes. The illustrated exhaust conduits 222, 224, 228, 230, 236 preferably are formed as dual passage structures in general. More specifically, as shown in FIG. 3 with the exhaust manifolds 222, 224 and the exhaust pipe 236, water jackets 262 are defined around the outer exhaust passages 226 thereof. Also, as exemplarily shown in FIG. 6, the cylinder block 90 defines water jackets 266 around the cylinder bores 92.

With reference to FIG. 6, the ECU 174 preferably comprises a CPU, memory or storage modules such as, for example, ROM and RAM and a timer or clock module. Those modules are electrically coupled together within a water-tight, hard box or container. The respective modules preferably are formed as a LSI and can be produced in a conventional manner. The timer module can be unified with the CPU chip. The watercraft 30 is additionally provided with a power source such as a battery that supplies electric power to the ECU 174 and other electrical components.

As described above, the preferred ECU 174 stores a plurality of control maps (three-dimensional maps or others) or equations related to various control routines. In order to determine appropriate control indexes in the maps or to calculate them using equations based upon the control indexes determined in the maps, various sensors are provided for sensing engine conditions and other environmental conditions.

With reference to FIGS. 6 and 7, a throttle valve position sensor or throttle valve opening degree sensor 268 is provided proximate the valve shaft 156 to sense an opening position or opening degree of the throttle valves 154. A sensed signal is sent to the ECU 174 through a sensor signal line 270. Of course, the signals can be sent through hard-wired connections, emitter and detector pairs, infrared radiation, radio waves or the like. The type of signal and the type of connection can be varied between sensors or the same type can be used with all sensors.

Associated with the crankshaft 83 is a crankshaft angle position sensor 272 which, when measuring crankshaft angle versus time, outputs a crankshaft rotational speed signal or engine speed signal that is sent to the ECU 174 through a sensor signal line 274, for example. The sensor 272 preferably comprises a pulsar coil positioned adjacent to the crankshaft 83 and a projection or cut formed on the crankshaft 83. The pulsar coil generates a pulse when the projection or cut passes proximate the pulsar coil. In one arrangement, the number of passes can be counted. The sensor 227 thus can sense not only a specific crankshaft angle but also a rotational speed of the crankshaft 83, i.e., engine speed. Of course, other types of speed sensors also can be used.

An air intake pressure sensor 278 is positioned along one of the intake passages 150 preferably at a location downstream of the throttle valve 154 of the intake passage 150. The intake pressure sensor 278 senses an intake pressure in this passage 150 during the engine operation. The sensed signal is sent to the ECU 174 through a sensor signal line 280, for example.

An intake air temperature sensor 282 is positioned next to the intake pressure sensor 278. The air temperature sensor 282 senses a temperature of the intake air in the intake passage 150. The sensed signal is sent to the ECU 174 through a sensor signal line 284, for example.

A water temperature sensor 288 at the water jacket 266 sends a cooling water temperature signal to the ECU 174 through a sensor signal line 290, for example. This signal can represent engine temperature.

An oxygen ($O_2$) sensor 292 senses oxygen density in the exhaust gases. The sensed signal is transmitted to the ECU 174 through a sensor signal line 294, for example. The signal can represent an air/fuel ratio and helps determine how complete combustion is within the combustion chambers 98.

The ECU 174 does not need any sensor at either the stepper motor 172 or the control valve 170 because the ECU 174 sends sequential pulses to the stepper motor 172 to move the control valve 170 step by step and the ECU 174 counts the number of the pulses. Motors or actuators other than the stepper motor 172 are applicable. The ECU 174 is aware of a position of the control valve 170, i.e., an opening degree of the control valve 170. Certain other motors or actuators need a sensor so that the ECU 174 can sense a position of the control valve through a sensor signal line connected to the ECU 174, for example.

Other sensors can be of course provided to sense other conditions of the engine 44 or environmental conditions around the engine 44.

As described above, the drive motor 200 of the high pressure fuel pump 184 is controlled by the ECU 174 with a duty ratio control method. With reference to FIGS. 6 and 8–10, the duty ratio control of the drive motor 200 is described below.

Figures 8, 9, 10:
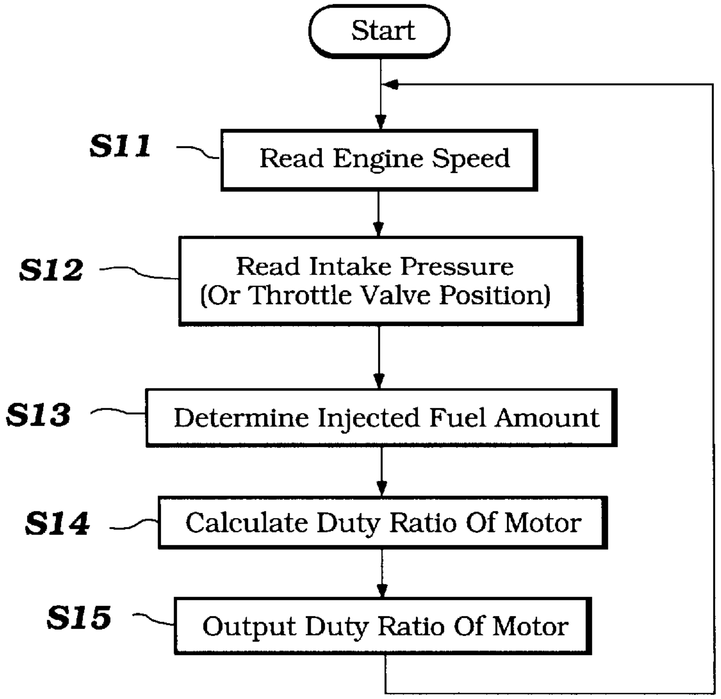
FIG. 8 is a block diagram showing a control routine for controlling a fuel pump in the fuel injection system shown in FIG. 6.
FIG. 9 is a block diagram showing a three-dimensional map used for determining amounts of fuel in the motor control routine shown in FIG. 8.
FIG. 10 is a block diagram showing a control map used for determining duty ratios of the motor in the motor control routine.

Preferably, the ECU 174 stores a three-dimensional map shown in FIG. 9 and a control map shown in FIG. 10. The ECU 174, using the three dimensional map of FIG. 9, can determine an amount of fuel $T_{mn}$ needed to create an air fuel charge with a desored air/fuel ratio (e.g., stoichiometric) based on an intake pressure and an engine speed.

The ECU 174 uses the control map of FIG. 10 to calculate an amount of fuel that is pumped out by the high pressure fuel pump 184 in accordance with the amount of injected fuel. Specifically, the ECU 174 adds an amount A to the injected amount to determine the delivered fuel. The ECU 174 then converts the pumped out amount $T_{mm}$+A into a duty ratio D of the drive motor 200 with the control map of FIG. 10.

The control routine shown in FIG. 8 illustrates an exemplary program of the duty ratio control. The program starts and proceeds to the step S11. At the step S11, the ECU 174 reads an engine speed with the signal from the crankshaft angle position sensor 272. The program then goes to the Step S12.

At the Step S12, an intake pressure is detected. For example, the ECU 174 can sample the output of the intake pressure sensor 278. After the Step S12, the program moves to a Step 13.

At the Step S13, the ECU 174 determines a desired fuel amount $T_{mn}$. For example, the ECU 174 can use the detected intake pressure and engine speed to determine the desired fuel amount from the three-dimensional map of FIG. 9. After the Step S13, the program goes to the Step S14.

At the Step S14, a duty ratio D is calculated. For example, the ECU 174 can use the desired fuel amount $T_{mn}$ and further a delivered fuel amount $T_{mn}$+ A corresponding to the injected fuel amount in referring to the control map of FIG. 10. After the Step S14, the program moves to the step S15.

At the Step S15, the duty ratio signal is outputted. For example, the ECU 174 can activate the drive motor 200 intermittently in accordance with the calculated duty ratio. Afterwards, the program returns to the step S11 to repeat.

The duty ratio control of the drive motor 200 is advantageous because heat built in the motor 200 is sufficiently restrained by the intermittent activation thereof. In particular, the motor 200 in this arrangement is positioned within the vapor separator 180 as well as the fuel pump 184. Unless the duty ratio control is applied, the heat built by continuing motor activation can produce bubbles either in the vapor separator 180 or in the delivery passage 186. The bubbles, in turn, can make the determined injected fuel amount fluctuate.

Alternatively, the throttle valve opening degree can replace the intake pressure in the three-dimensional map of FIG. 9. In this alternative, the program reads a throttle valve opening degree with the signal from the throttle valve position sensor 268 at the step S12.

A similar duty ratio control is disclosed in a co-pending U.S. application filed Feb. 3, 2000, titled FUEL INJECTION FOR ENGINE, which serial number is 09/497,570, the entire contents of which is hereby expressly incorporated by reference.

Hereinafter, the control that determines an amount of injected fuel with the intake pressure and the engine speed is referred to as a D-j control mode, while the control that determines the same with the throttle valve opening degree and the engine speed is referred to as an α-N control mode.

One aspect of the present invention includes the realization that although the D-j control mode operates satisfactorily at lower engine speeds and smaller throttle openings, it does not perform as well at relatively higher engine speeds and larger throttle openings. In particular, this is performance differential is remarkable with multiple cylinder engine that employs separate throttle valves at respective intake passages.

It has also been found that the α-N control scenario performs better than the D-j scenario at higher engine speeds and larger throttle openings. In particular, this performance disparity is remarkable in multiple cylinder engines that employs separate throttle valves at each respective intake passage.

Switching Between D-J Control Mode And α-N Control Mode

Figure 11:
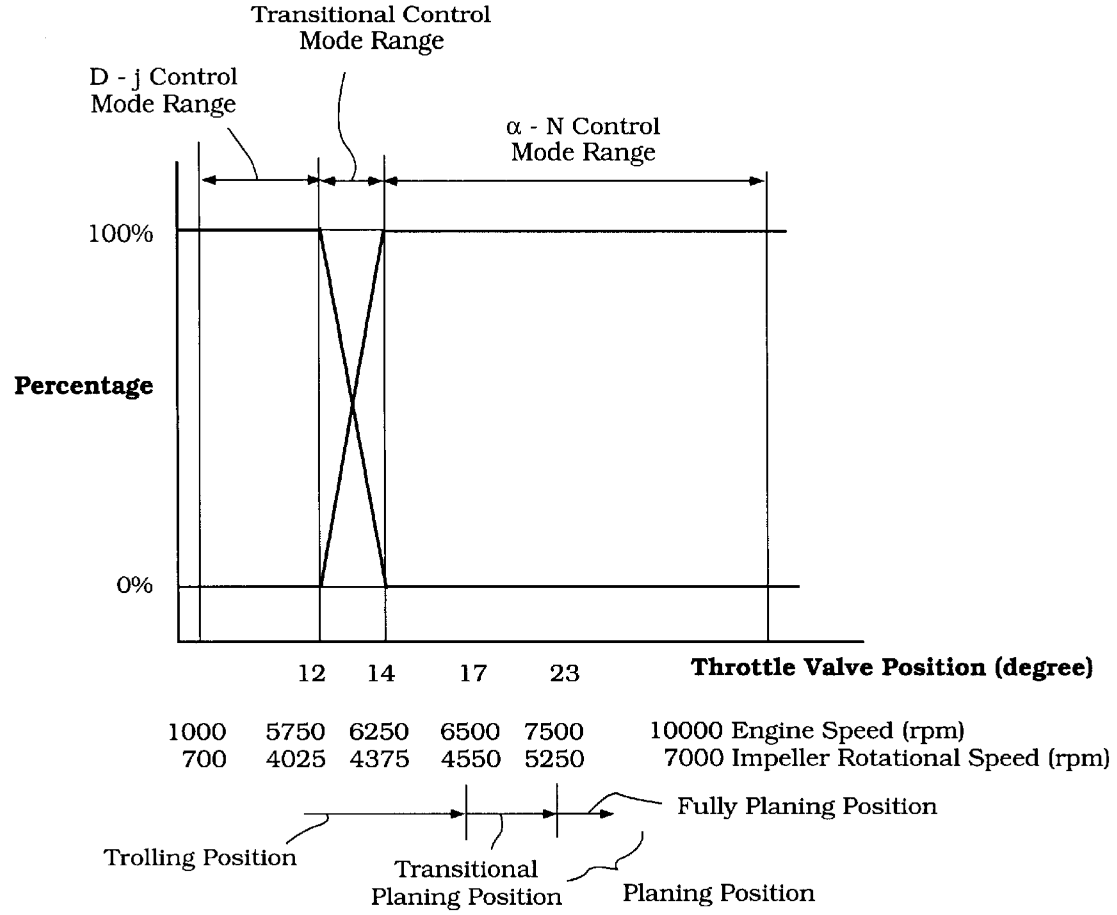
FIG. 11 is a graphical illustration of an operational scenario using a D-j control mode and an α-N control mode in response to changes in a throttle valve opening degrees, engine speed of the engine and an impeller rotational speed of the watercraft shown in FIG. 1.

With reference to FIG. 11, the preferred ECU 174 is configured to use switch between the D-j control mode and the α-N control mode depending on the signal from the throttle valve position sensor 268. More specifically, the ECU 174 selects the D-j control mode when the throttle valve 154 is positioned in relatively small openings, i.e., relatively small opening degree ranges such as, for example, a range of less than or equal to twelve degrees and greater than one degree.

The ECU 174 is also configured to select the α-N control mode when the throttle valve 154 is positioned in relatively larger openings, i.e., relatively large opening degree ranges such as, for example, equal to or greater than 14 degrees. In the preferred embodiment, a transitional control range is defined between the D-j control range and the α-N control range, i.e., greater than approximately twelve degrees and less than approximately 14 degrees.

Figure 13:
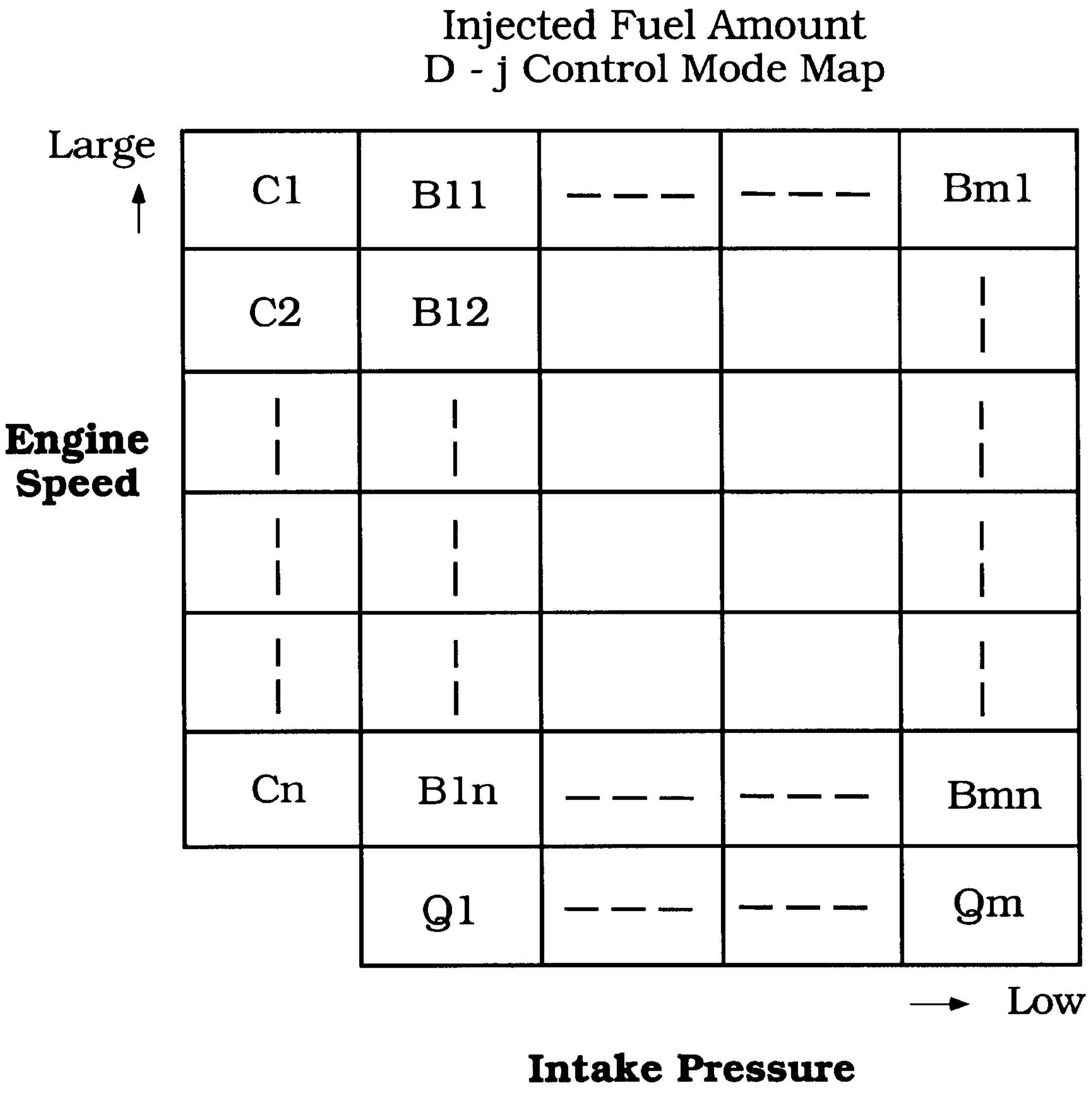
FIG. 13 is a block diagram showing a three-dimensional map used for determining amounts of fuel in the D-j control mode.
Figure 14:
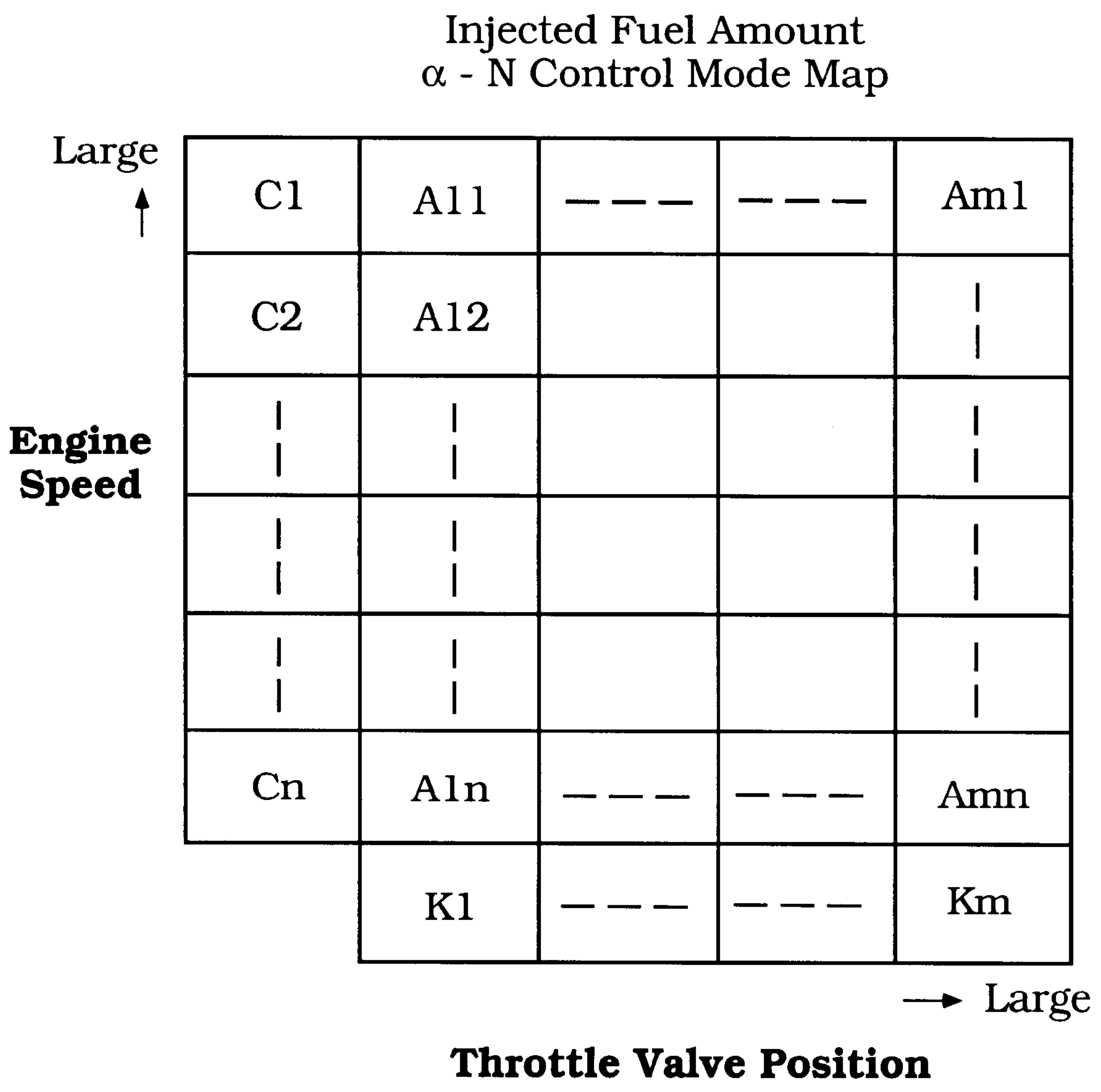
FIG. 14 is a block diagram showing a three-dimensional map used for determining amounts of fuel in the α-N control mode.

In order to use both the D-j control mode and the α-N control mode, the ECU 174 includes a three-dimensional map comprising the intake pressure $Q_m$, the engine speed $C_n$ and the injected fuel amount $B_{mn}$ data as shown in FIG. 13 and another three-dimensional map comprising the throttle valve opening degree $K_m$, the engine speed $C_n$ and the injected fuel amount $A_{mn}$ data as shown in FIG. 14.

The map of FIG. 13 is substantially the same as the map of FIG. 9 but is illustrated in a slightly different way. The ECU 174 uses the map of FIG. 13 during the D-j control mode and uses the map of FIG. 14 during the α-N control mode.

The ECU 174 in this embodiment, combines or mixes the D-j control mode and the α-N control mode in accordance with a predetermined combination ratio stored in the ECU 174, when in the transitional control range. The ECU 174 thus uses both the maps of FIGS. 13 and 14 in the transitional control range.

Although various combination ratios are practicable, the preferred ECU 174 applies a linear combination ratio as shown in FIG. 11. That is, a percentage of the D-j control mode linearly decreases to 0% from 100%, while a percentage of the α-N control increases to 100% from 0% as the throttle valve opening increases within the transitional control range. For example, the combination ratio at the throttle valve opening 13.0 degrees is 50% D-j control and 50% α-N control. The combination ratio at the throttle valve opening 13.2 degrees is 40% D-j control and 60% α-N control.

The ECU 174 calculates an amount of desired fuel based upon the combination ratio. For example, if the combination ratio is 40% D-j control and 60% α-N control, the ECU 174 calculates the desired injected fuel amount $AB_{mn}$ using the equation as follows:

$$AB_{mn}=B_{mn}\times 40\%+A_{mn}\times 60\%$$

The values of $B_{mn}$ and $A_{mn}$ are the desired injected fuel amounts shown in FIGS. 13 and 14, respectively.

FIG. 11 additionally illustrates relationships between the throttle opening degree and the respective transition timings of the watercraft positions. The illustrated watercraft 30 transfers to the transitional planing position from the trolling position at the throttle valve opening degree of approximately 17 degrees and transfers to the fully planing position from the transitional planing position at the throttle valve opening degree of approximately 23 degrees. As is clearly understood by the illustration of FIG. 11, both the throttle valve opening degrees, i.e., 17 degrees and 23 degrees, are greater than the throttle valve opening degree at which the transitional control range ends and the α-N control range starts because the subject throttle valve opening degree is 14 degrees. In other words, the ECU 174 completes switching to the α-N control mode from the D-j control mode before the watercraft 30 starts transferring to the planing position from the trolling position.

Because of setting the switching timings of the D-j and α-N control modes before the transferring timing of the watercraft 30 to the planing position from the trolling position, the rider does not sense a change in the behavior of the engine 44 during transition to the planing position. Since the rider normally runs the watercraft 30 in the planing position and thus the feeling of the watercraft 30 in the planing position is the most significant matter for the rider, the control of the engine 44 is improved. In addition, the D-j and α-N control modes are switched to exploit the performance disparity between these two modes of operation. Thus, the desired air/fuel ratio is better controlled.

Alternatively, the signal from the crankshaft angle position sensor 272, which indicates the engine speed, is of course available instead of the signal from the throttle valve position sensor 268. FIG. 11 illustrates engine speeds corresponding to the throttle valve opening degrees. Additionally, impeller rotational speeds corresponding to both the throttle valve opening degrees and the engine speeds are also illustrated in FIG. 11. For example, the transitional control range starts at throttle valve opening degree of twelve degrees, engine speed of 5,750 rpm and impeller rotational speed of 4,025 rpm and ends at throttle valve opening degree of 14 degrees, engine speed of 6,250 rpm and impeller rotational speed of 4,375 rpm. Thus, in this embodiment, the watercraft 30 transfers to the transitional planing position at throttle valve opening degree of 17 degrees, engine speed of 6,500 rpm and impeller rotational speed of 4,550 rpm and then transfers to the fully planing position at throttle valve opening degree of 23 degrees, engine speed of 7,500 rpm and impeller rotational speed of 5,250 rpm. It should be noted that the foregoing numeric values are approximate and exemplary ones and other watercraft may have other numeric values.

In this description, the D-j control range corresponds to a smaller opening range of the throttle valve 154 and also to a low engine speeds. Also, the α-N control range corresponds to a larger throttle openings and also to a higher engine speeds. Additionally, the transitional control range mixing the D-j control mode and α-N control mode corresponds to a intermediate throttle openings engine speeds.

A similar switching control between the D-J control mode and the α-N control mode is disclosed in a co-pending U.S. application filed Nov. 8, 2000, titled MARINE ENGINE CONTROL SYSTEM, which Ser. No. is 09/708,900, the entire contents of which is hereby expressly incorporated by reference.

Control of Control Valve In The Bypass Passage

Figure 12:
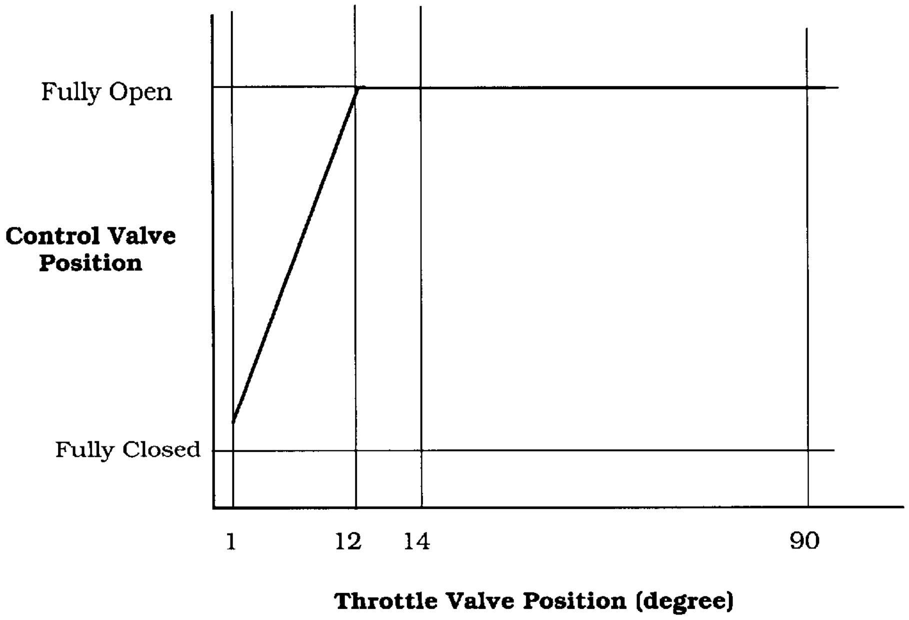
FIG. 12 is a graphical illustration showing a characteristic regarding an open degree of the control valve (vertical axis) disposed in a bypass passage (FIG. 7) in response to the throttle valve opening (horizontal axis).
Figure 15:
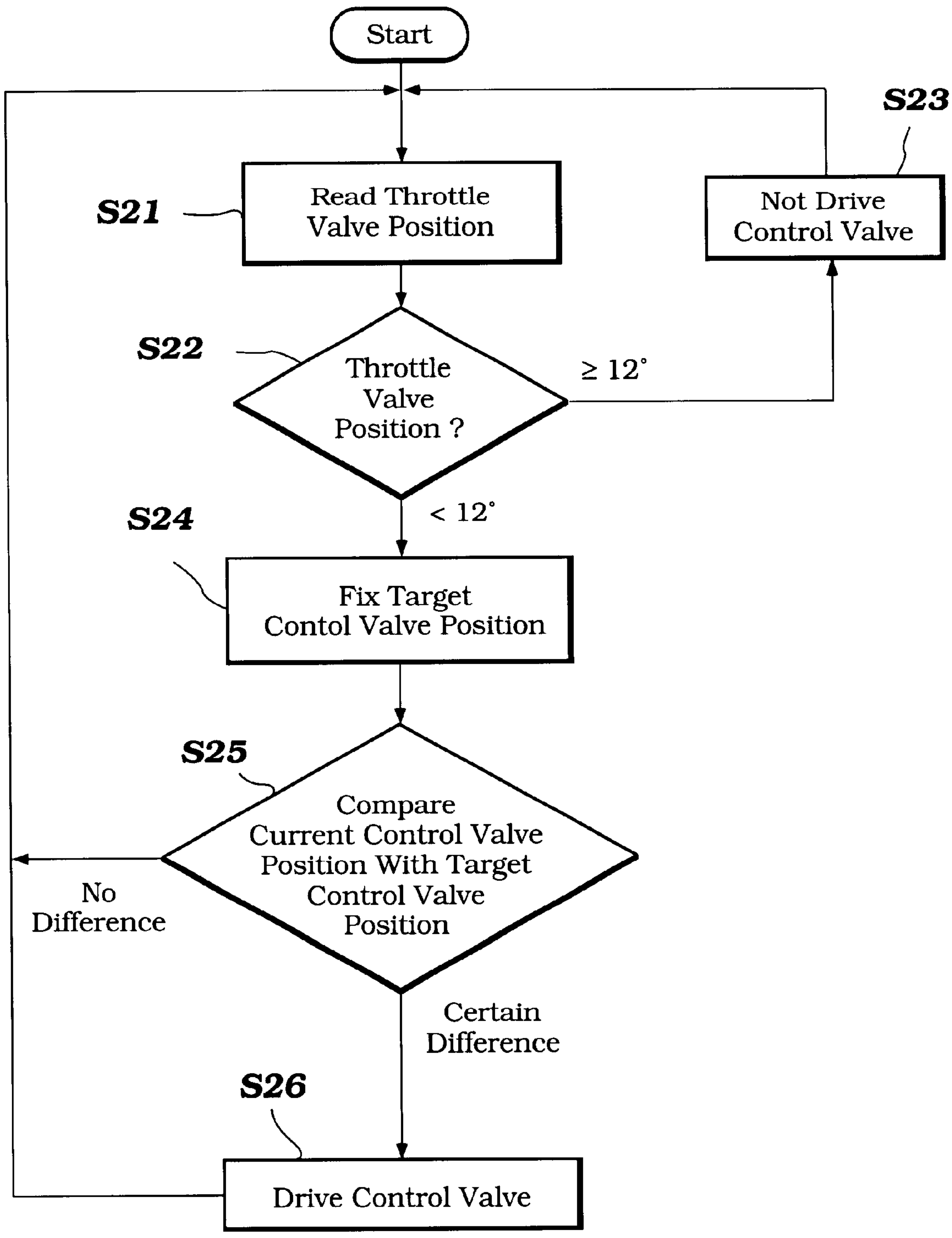
FIG. 15 is a block diagram showing a control routine for control of the control valve shown in FIG. 7.

With reference to FIGS. 12 and 15, an exemplary control of the control valve 170 in the bypass passage 166 is described below.

In order to prevent the engine 44 from stalling when the rider abruptly releases the throttle lever 58, which thereby quickly closes the throttle valve 154, at a relatively high engine speed range, the preferred ECU 174 practices a dash-pod control such that the control valve 170 is in an open position.

As shown in FIG. 12, the opening degree of the illustrated control valve 170 increases linearly as the opening of the throttle valve 154 increases. That is, the control valve 170 is controlled to move toward the open position in proportion to the throttle valve opening degree. This control can effectively prevent the engine from stalling because, when the rider abruptly closes the throttle valve 154, the control valve 170 has already been in the open position and can supplement the sudden lack of air. In addition, even if the throttle valve 154 rapidly returns to the closed position, the control valve 170 returns to its closed position more slowly than that of the throttle valve 154. This is because the step motor 172 is relatively slower to respond.

Theoretically, the control valve 170 can reach the fully open position simultaneously when the throttle valve 154 reaches the fully open position. However, it has been found that the air/fuel ratio is apt to deviate from the desired air/fuel ratio particularly in the high speed range of the engine speed in which the ECU 174 uses the α-N control mode and occasionally in the transitional control range because an increase rate of the air amount passing through the bypass passage 166 is not sensed. This is because air amount passing through the bypass passage 166 during α-N control and the transitional control ranges is relatively large and hence a small movement of the control valve 170 can greatly affect the amount of air reaching the combustion chambers 98 in those ranges. That is, the unknown fluctuation of the air amount can throw the control in those ranges into disorder. In such a situation, the rider may feel a change in the behavior of the engine 44.

The preferred ECU 174 thus is configured such that the increase of the control valve opening degree completes when the opening degree of the throttle valve 154 reaches twelve degrees, i.e., before the transitional control range starts as shown in FIG. 12. Otherwise, the control valve 170 preferably stays in the fully open position at least when the throttle valve 154 is positioned relatively closer to the low opening degree range in the high Opening degree range (or when the engine speed is positioned relatively closer to the low speed range in the high opening degree range). The control valve 170, which now is placed at the fully open position, stays at this position regardless of further increase of the opening degree of the throttle valve 154. As such, the ECU 174 can detect and compensate for the actual amount of air passing through the bypass passage 166 when the control valve 170 is in the fully open position. Thus, no fluctuation of the air amount caused by movement of the control valve 170 affects the fuel control in the transitional range and the α-N control range accordingly.

FIG. 15 illustrates an exemplary control routine of the control valve 170. The program starts and proceeds to the step S21. At the step S21, the ECU 174 reads a throttle valve opening degree. After the step S21, the routine moves to a step S22.

At the step S22, it is determined whether the throttle valve opening is greater than or equal to twelve degrees. For example, the ECU 174 can sample the output of the throttle valve position sensor 268 and compare the corresponding throttle opening to the predetermined angle of twelve degrees. If the throttle valve opening is greater than or equal to twelve degrees, the routine moves to a step S23.

At the step S23, the control valve 170 is not moved. For example, as noted above, in the preferred embodiment, the control valve 170 is driven by a stepper motor 172. Thus, the ECU 174 can prevent signal from being sent to the stepper motor 172, thereby preventing the stepper motor 172 from further driving the control valve 170 to another position. After the step S23, the routine returns to the step S21 and repeats.

With reference to the step S22, if the throttle valve opening is not greater than or equal to 12 degrees, the routine moves to step S24.

At the step S24, a target or desired opening size of the control valve 170 is determined. After the step S24, the routine moves to a step S25.

At the step S25, the current position of the control valve 170 is compared with the target position of the control valve 170 determined in the step S24. For example, the ECU 174 can compare the position of the stepper motor 172 with the target position determined in the step S24. If it is determined that there is no difference between the target and the current position of the control valve 170, the routine returns to the step S21 and repeats.

With reference to the step S25, if it is determined that the current and target positions of the control valve 170 are not the same, the routine moves to a step S26.

In the step S26, the control valve 170 is moved to the target position. For example, the ECU 174 can control the stepper motor 172 through the stepper motor control line 175 so is to move the control valve 170 to the target position determined in the step S24. After the step S26, the routine returns to the step S21 and repeats.

A similar control of the control Valve also is disclosed in the co-pending U.S. application filed Nov. 8, 2000, titled MARINE ENGINE CONTROL SYSTEM, which Ser. No. is 09/708,900.

Safety And Warning Control In Case of Abnormal Condition of Engine

Figure 16:
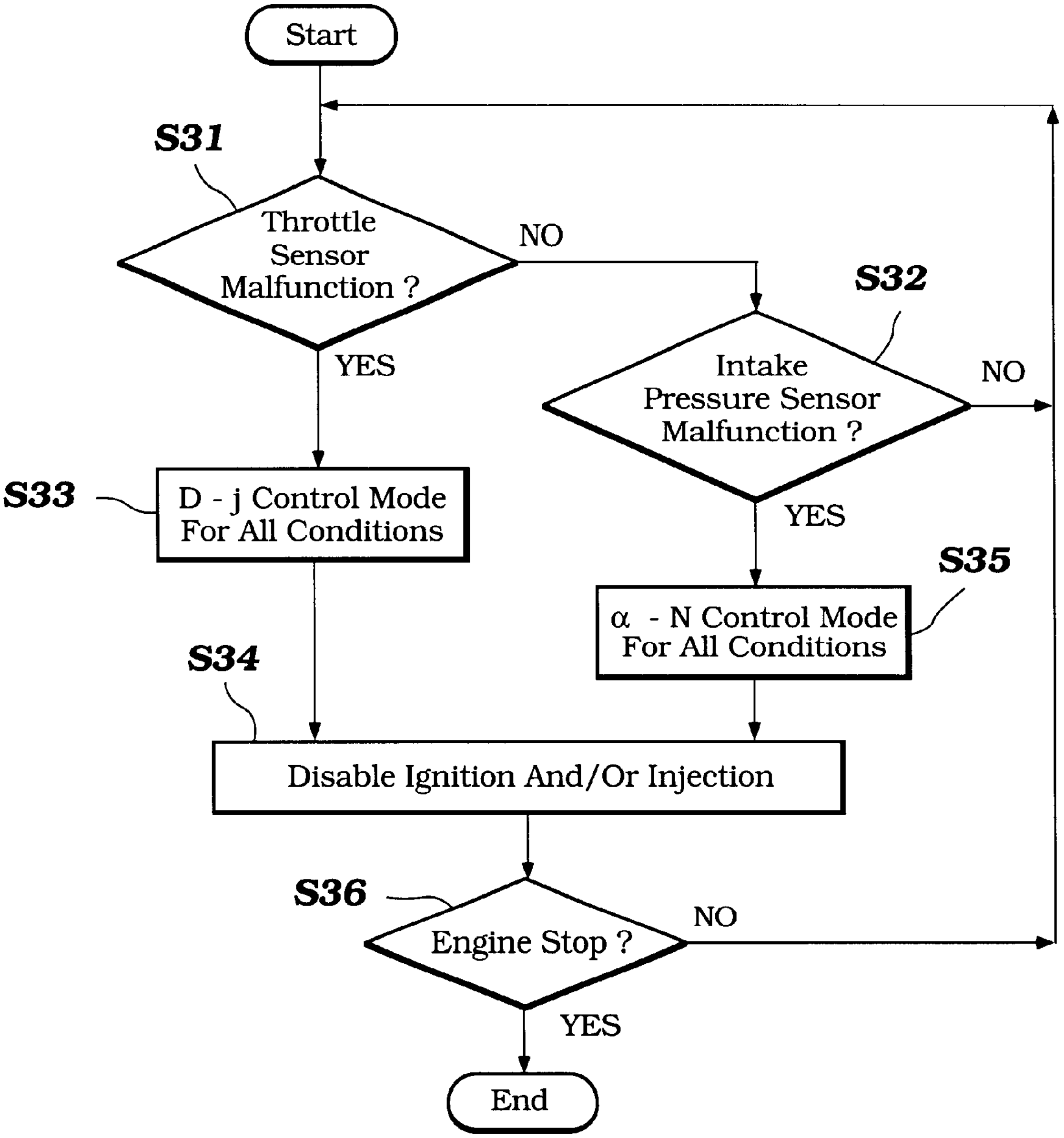
FIG. 16 is a block diagram showing an engine control routine for control of the engine operation in the event of malfunction of either a throttle valve position sensor or an intake pressure sensor.

With reference to FIG. 16, a safety and warning control routine for abnormal operation of the engine 44 is described below.

The preferred ECU 174 is configured to control the engine operation in a safe mode if an abnormal condition occurs with the engine 44 such as at least one of the sensors malfunctions. This emergency control also can be a warning for the rider that the engine is operating under an abnormal condition so that the rider can immediately return to a wharf or seashore.

For example, if the intake pressure sensor 278 malfunctions, the ECU 174 switches to the α-N control mode by disregarding the normal control routine and uses only the α-N control mode regardless of the engine speed unless the intake pressure sensor 278 returns to a normal condition. If the throttle valve position sensor 268 malfunctions, the ECU 174 switches to the D-j control mode by disregarding the normal control routine and uses only the D-j control mode regardless of the engine speed unless the throttle valve position sensor 268 returns to a normal condition.

Although the emergency control is quite effective, the rider generally cannot notice that the engine operation is in the emergency control. For example, if the D-j control mode is practiced in the high speed range of the engine speed, the air amount is likely to be larger than a required amount and the air/fuel ratio is thus is on a lean side. The rider, however, continues to operate the watercraft as usual because the rider has no indication that the emergency control has started and the changes in engine behavior are not easily perceived by a typical rider.

Preferably, with the emergency control, the ECU 174 disables the firing at least at one of the spark plugs 210 and/or disables the fuel injection for at least at one of the fuel injectors 176. The output of the engine 44 thus is effectively reduced and at the same time the rider can notice that the engine 44 is operating abnormally.

FIG. 16 illustrates an exemplary control program that is provided for the abnormal condition. The program starts and proceeds to the step S31. At the step S31, it is determined whether or not the throttle valve position sensor 268 has malfunctioned. For example, the ECU 174 can sample the output from the throttle valve position sensor 268 and compare the output to known proper outputs. If it is determined that the throttle position sensor 1268 is not malfunctioning, the routine moves to step S32. At the step S32, it is determined whether the intake pressure sensor 278 has malfunctioned. For example, the ECU 174 can sample the output of the intake pressure sensor 278 and compare the output to known normal outputs. If it is determined that the intake pressure sensor has not malfunctioned, the routine returns to the step S31 and repeats. If, however, it is determined that the throttle position sensor 268 has malfunctioned, the routine moves to step S33.

At the step S33, engine operation is continued under the D-j control mode for all conditions. For example, the ECU 174 is configured to use only the D-J control mode regardless of engine speed and throttle positions. After the step S33, the routine moves to step S34.

At the step S34, ignition and or fuel injection is disabled for one of the cylinders of the engine 44. For example, the ECU 174 can stop sending signals to one of the fuel injectors 176 and/or one of the spark plugs 210. Thus, one of the cylinders of the engine 44 will be disabled, thus causing the engine to run abnormally. Under such a condition, the output of the engine 44 is reduced, thus causing the watercraft 30 to move more slowly. However, the engine 44 can continue to run and thereby allow a rider to return the watercraft 30 to the shore or a dock. After the step S34, the routine moves to step S36.

At the step S36, it is determined whether or not the engine has stopped. For example, the ECU 174 can sample an output of the engine speed sensor 272. If the sampled output of the sensor 272 indicates that the engine 44 stopped, the ECU 174 can indicate that the engine 44 has stopped. If the engine has stopped, the routine ends. If, however, it is determined that the engine has not stopped, the routine returns to the step S31 and repeats.

With reference to step S32, if it is determined that the intake pressure sensor has malfunctioned, the routine moves to a step S35.

At the step S35, the α-N control mode is used for all engine conditions. For example, in the step S35, the ECU 174 can be configured to use only the α-N control mode regardless of engine speed. After the step S35, the routine moves to the step S34 and continues as noted above.

Additionally, for example, if the water temperature sensor 288 malfunctions, the intake air temperature sensor 282 can replace the water temperature sensor 288. Under this condition, the ECU 174 can slow down the engine speed as described above to protect the engine and to worn the rider of the abnormal condition.

Also, if the intake pressure sensor 278 is out of the position, the sensor 278 senses the atmospheric pressure rather than the intake pressure. The ECU 174 can switch to the α-N control mode in this situation and also can slow down the engine speed.

Further, when a voltage of the battery is less than a preset voltage despite the engine speed is greater than a preset speed, the ECU 174 recognizes either a battery load is excessive or a battery charging system is in abnormal condition. The ECU 174 can switch the D-j control mode to the α-N control mode or vice versa and also slow down the engine speed.

A similar safety and warning control in case of abnormal conditions of the engine is disclosed in a co-pending U.S. application filed Jul. 27, 2000, titled ENGINE CONTROL SYSTEM FOR OUTBOARD MOTOR, which Ser. No. is 09/626,870, the entire contents of which is hereby expressly incorporated by reference.

Other controls and operations, which are of course simultaneously practiced, are omitted in this description. In addition, it should be noted that the control system can be stored as software and executed by a general purpose controller other than the ECU, can be hardwired, or can be executed by a devoted controller.

Of course, the foregoing description is that of a preferred construction having certain features, aspects and advantages in accordance with the present invention. Various changes and modifications may be made to the above-described arrangements without departing from the spirit and scope of the invention, as defined by the appended claims.

What is claimed is:

1. A planing-type watercraft comprising a hull, a propulsion device arranged to propel the hull, an internal combustion engine driving the propulsion device, the engine comprising an engine body, at least one moveable member moveable relative to the engine body, the engine body and the moveable member together defining at least one combustion chamber, an air intake system configured to guide air to the combustion chamber, the intake system including a throttle valve, the throttle valve moveable generally between a closed position and an open position, a fuel injection system configured to inject fuel for combustion in the combustion chamber, an intake pressure sensor, a throttle position sensor, an engine speed sensor, and a control device configured to control an amount of the fuel using either a first control mode or a second control mode, the first control mode being based upon a signal from the intake pressure sensor and a signal from the engine speed sensor, the second control mode being based upon a signal from the throttle position sensor and the signal from the engine speed sensor, the control device using the first control mode when either an opening of the throttle valve is relatively small or when an engine speed is relatively low, the control device using the second control mode when either the opening of the throttle valve is relatively large and when the engine speed is relatively high, the controller being further configured to use only the first control mode for all engine speeds if the throttle position sensor malfunctions and to use only the second control mode for all engine speeds if the intake pressure sensor malfunctions.

2. A watercraft comprising a hull, an engine supported by the hull, the engine comprising an engine body, a fuel supply system connected to the engine and configured to supply fuel for combustion in the engine body, a first sensor configured to detect a first engine operation parameter and a second sensor configured to detect a second engine operation parameter, and a controller configured to control at least the fuel supply system, the controller being configured to control the fuel supply system according to a first mode in a first engine speed range and to control the fuel supply system according to a second mode in a second engine speed range, the controller being further configured to control the fuel supply system according to a malfunction mode in which the first mode is used to control the fuel supply system for the second engine speed range if the second sensor malfunctions, and to use the second mode to control the fuel supply system for the first engine speed range if the first sensor malfunctions.

3. The watercraft as set forth in claim 2, wherein the controller is configured to uses both the first and second control modes during a third engine speed range that is between the first and second engine speed ranges.

4. The watercraft as set forth in claim 3, wherein the control device combines the first and second control modes in a preset ratio in using both the first and second control modes during the third engine speed range.

5. The watercraft as set forth in claim 4 additionally comprising an induction system configured to guide air to the engine body and a throttle valve disposed in the induction system, wherein the ratio generally linearly varies either as a throttle valve opening increases or as the engine speed increases.

6. The watercraft as set forth in claim 2, wherein the engine comprises a plurality of the moveable members to define a plurality of the combustion chambers together with the engine body, the intake system includes a plurality of intake passages communicating with the combustion chambers, and a plurality of the throttle valves, each one of the throttle valves is disposed within each one of the intake passages.

7. The watercraft as set forth in claim 2 additionally comprising a water jet propulsion unit driven by the engine.

8. The watercraft as set forth in claim 2 additionally comprising an induction system configured to guide air to the engine body and a throttle valve disposed in the induction system, wherein the fuel supply system comprises a fuel injection system including a fuel injector arranged to inject the fuel at a location downstream of the throttle valve.

9. The watercraft as set forth in claim 2 additionally comprising an induction system configured to guide air to the engine body, wherein the induction system includes an intake passage communicating with the combustion chamber and a throttle valve disposed within the intake passage.

10. The watercraft as set forth in claim 9, wherein the induction system additionally includes an intake passage bypassing the throttle valve, and a control valve regulating an amount of air passing through the second intake passage, the control valve being moveable between a closed position and an open position.

11. The watercraft as set forth in claim 10, wherein the control valve is configured to move toward the open position as the throttle valve moves toward an open position.

12. The watercraft as set forth in claim 11, wherein the first engine speed range is lower than the second engine speed range, the control valve being configured to stay in the open position except for during the first engine speed range.

13. The watercraft as set forth in claim 10 additionally comprising a stepper motor to move the control valve, the control device controlling the stepper motor.

14. The watercraft as set forth in claim 2, wherein the controller is configured to reduce the engine speed when at least one of the first and second sensors malfunction.

15. The watercraft as set forth in claim 14 additionally comprising an ignition system, wherein the controller is configured to reduce engine speed by disabling at least one of fuel injection and ignition in at least one combustion chamber defined in the engine body.

16. A watercraft comprising a hull, an engine supported by the hull, the engine comprising an engine body, a fuel supply system connected to the engine and configured to supply fuel for combustion in the engine body, a first sensor configured to detect a first engine operation parameter and a second sensor configured to detect a second engine operation parameter, and a controller configured to control at least the fuel supply system, the controller being configured to control the fuel supply system according to a first mode in a first engine speed range and to control the fuel supply system according to a second mode in a second engine speed range, the controller comprising malfunction mode means for controlling the fuel supply system according to a malfunction mode in which the first mode is used to control the fuel supply system for the second engine speed range if the second sensor malfunctions, and to use the second mode to control the fuel supply system for the first engine speed range if the first sensor malfunctions.

17. The watercraft as set forth in claim 16 additionally comprising an induction system configured to guide air to the engine body, a throttle valve disposed in the induction system, an intake passage bypassing the throttle valve, and a control valve regulating an amount of air passing through the second intake passage, the control valve being moveable between a closed position and an open position.

18. The watercraft as set forth in claim 17 additionally comprising means for moving the control valve toward the open position as the throttle valve moves toward an open position.

19. The watercraft as set forth in claim 16 additionally comprising an induction system configured to guide air to the engine body and a throttle valve disposed in the induction system, the first sensor being a pressure sensor communicating with the induction system and configured to detect a pressure in the induction system, the second sensor being a throttle valve position sensor configured to detect a position of the throttle valve.

20. The watercraft as set forth in claim 16 additionally comprising means for slowing the engine speed when at least one of the first and second sensors malfunctions.

21. A method for controlling an engine for a watercraft, the method comprising detecting an engine speed, determining if the engine speed is in a first engine speed range or a second engine speed range which is higher than the first speed range, controlling fuel supply to the engine according to a first mode based on output from a first sensor when the engine speed is in the first range, controlling fuel supply to the engine according to a second mode based on output from a second sensor when the engine speed is in the second range, detecting a malfunction of the first and second sensors, controlling fuel supply according to the first mode in the second speed range when the second sensor malfunctions, and controlling fuel supply according to the second mode in the first engine speed range when the first sensor malfunctions.

22. The control method as set forth in claim 21 additionally comprising moving a control valve disposed in an intake passage bypassing the throttle valve toward an open position as the throttle valve moves toward an open position.

23. The control method as set forth in claim 21 additionally comprising lowering the engine speed if at least one of the first and second sensors malfunctions.

* * * * *